(12) United States Patent
Baxivanelis et al.

(10) Patent No.: US 11,052,531 B2
(45) Date of Patent: Jul. 6, 2021

(54) BATTERY RECEIVING AREA

(71) Applicant: Hilti Aktiengesellschaft, Schaan (LI)

(72) Inventors: Konstantin Baxivanelis, Kaufering (DE); Tobias Koeniger, Bregenz (AT)

(73) Assignee: Hilti Aktiengesellschaft, Schaan (LI)

( * ) Notice: Subject to any disclaimer, the term of this patent is extended or adjusted under 35 U.S.C. 154(b) by 125 days.

(21) Appl. No.: 16/345,092

(22) PCT Filed: Oct. 31, 2017

(86) PCT No.: PCT/EP2017/077885
§ 371 (c)(1),
(2) Date: Apr. 25, 2019

(87) PCT Pub. No.: WO2018/086964
PCT Pub. Date: May 17, 2018

(65) Prior Publication Data
US 2019/0283231 A1    Sep. 19, 2019

(30) Foreign Application Priority Data
Nov. 9, 2016 (EP) ..................... 16197919

(51) Int. Cl.
*B25F 5/02*         (2006.01)
*H01M 2/10*         (2006.01)
(Continued)

(52) U.S. Cl.
CPC ............. *B25F 5/02* (2013.01); *H01M 50/209* (2021.01); *B23D 45/16* (2013.01); *H01M 2220/30* (2013.01)

(58) Field of Classification Search
CPC ..... B26F 5/02; H01M 2/1066; H01M 2/1022; H01M 2220/30; H01M 2220/00;
(Continued)

(56) References Cited

U.S. PATENT DOCUMENTS 3,688,139 A * 8/1972 Yaguchi .................... B27B 9/00
                                                  310/50
3,728,664 A * 4/1973 Hurst .................. H04M 1/0262
                                                  439/341
(Continued)

FOREIGN PATENT DOCUMENTS

DE  112014000645   11/2015
DE  112013006573   12/2015

OTHER PUBLICATIONS

International Search Report of PCT/EP2017/077885, dated Feb. 13, 2018.

*Primary Examiner* — Phong H Nguyen
(74) *Attorney, Agent, or Firm* — Davidson, Davidson & Kappel, LLC

(57) ABSTRACT

A device for accommodating at least one battery on a power tool, in particular a circular saw, including a receiving plate for detachably holding the at least one battery, including at least one contact device for connecting the battery to the power tool, and a double hinge device having a first and a second rotation axis, the first rotation axis being positioned on a housing of the power tool, and the second rotation axis being positioned on the receiving plate, so that the receiving plate is reversibly pivotable around the first and the second rotation axis relative to the housing between a first and a second position.

15 Claims, 34 Drawing Sheets

(51) Int. Cl.
*H01M 50/209* (2021.01)
*B23D 45/16* (2006.01)

(58) Field of Classification Search
CPC .......... B23D 45/16; B23D 59/00; B27B 9/00; B25F 5/02
USPC .......................... 30/388, 166.3, 263, DIG. 1
See application file for complete search history.

(56) References Cited

U.S. PATENT DOCUMENTS

| | | | |
|---|---|---|---|
| 4,084,123 A * | 4/1978 | Lineback | H01M 2/1055 320/111 |
| 6,996,909 B1 * | 2/2006 | Buck | H01M 2/1055 30/388 |
| 2004/0177512 A1 * | 9/2004 | Lin | B25F 5/02 30/122 |
| 2009/0241350 A1 | 10/2009 | Lau et al. | |
| 2015/0055281 A1 | 2/2015 | Derosa | |
| 2015/0328764 A1 | 11/2015 | Yoshikane et al. | |
| 2015/0328796 A1 | 11/2015 | Okouchi et al. | |
| 2016/0176064 A1 | 6/2016 | Okouchi et al. | |

* cited by examiner

BATTERY RECEIVING AREA

The present invention relates to a device for accommodating at least one battery on a power tool. The power tool may be, for example, a circular saw or the like.

BACKGROUND

According to the prior art, batteries are often fastened on an underside of a housing of the power tool. However, the devices used for this purpose to detachably fasten the battery to the power tool usually have a relatively primitive or simple technical design.

A space-saving, and above all ergonomic, arrangement of the battery on the power tool often enough presents a major technical problem.

SUMMARY OF THE INVENTION

It is an object of the present invention to provide an improved device for accommodating at least one battery on a power tool, which facilitates a space-saving and ergonomic arrangement of the battery on a power tool.

The present invention provides a device for accommodating at least one battery on a power tool, in particular a circular saw.

According to the present invention, it is provided that the device includes a receiving plate for detachably holding the at least one battery, including at least one contact device for connecting the battery to the power tool, and a double hinge device having a first and second rotation axis, the first rotation axis being positioned on a housing of the power tool and the second rotation axis being positioned on the receiving plate, so that the receiving plate is reversibly pivotable between a first and a second position around the first and the second rotation axis.

According to one advantageous specific embodiment of the present invention, it may be possible for the receiving plate to contain a first and a second guide pin and for the housing to contain a first and a second guide groove, the first guide groove being designed to accommodate and guide the first guide pin, and the second guide groove being designed to accommodate and guide the second guide pin, so that the receiving plate is guided between the first and the second position at least during the pivoting movement. The secure movement of the receiving plate relative to the housing may be ensured hereby, and an excessive stressing of the double hinge device during a tilting or twisting of the receiving plate relative to the housing may be avoided.

Other advantages result from the following description of the figures. The figures illustrate different exemplary embodiments of the present invention. The figures, the description and the claims contain numerous features in combination. Those skilled in the art will advantageously also consider the features individually and combine them to form other meaningful combinations.

BRIEF DESCRIPTION OF THE DRAWINGS

In the figures, identical and equivalent components are provided with identical reference numerals.

DETAILED DESCRIPTION

Figure 1:
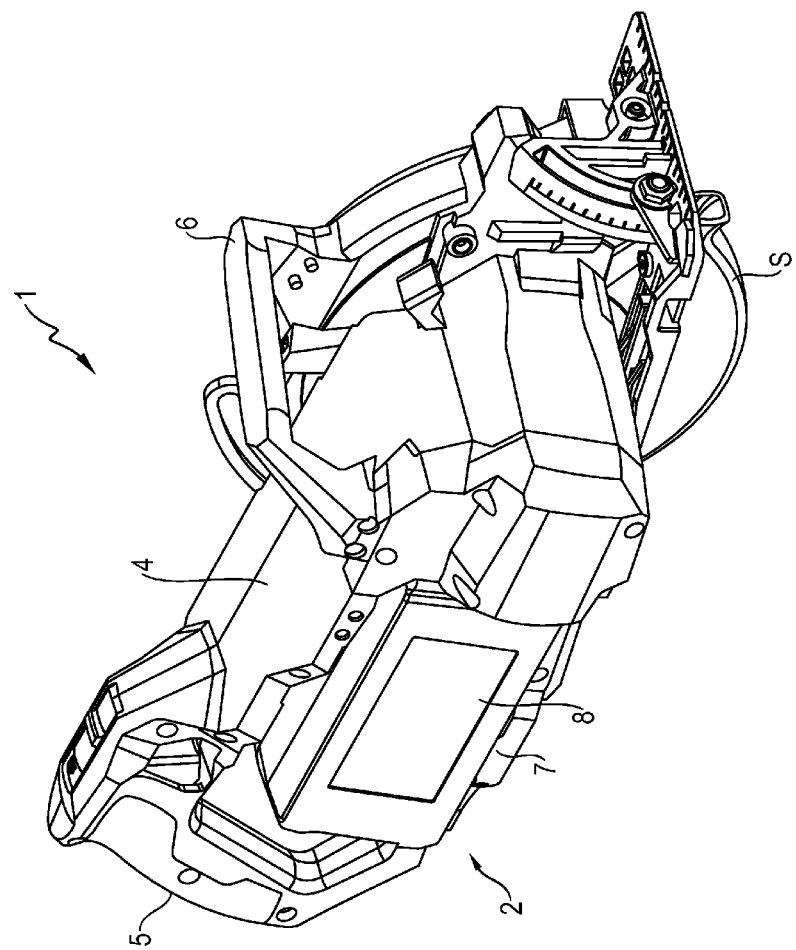
FIG. 1 shows a first perspective view of a power tool, including a battery.
Figure 2:
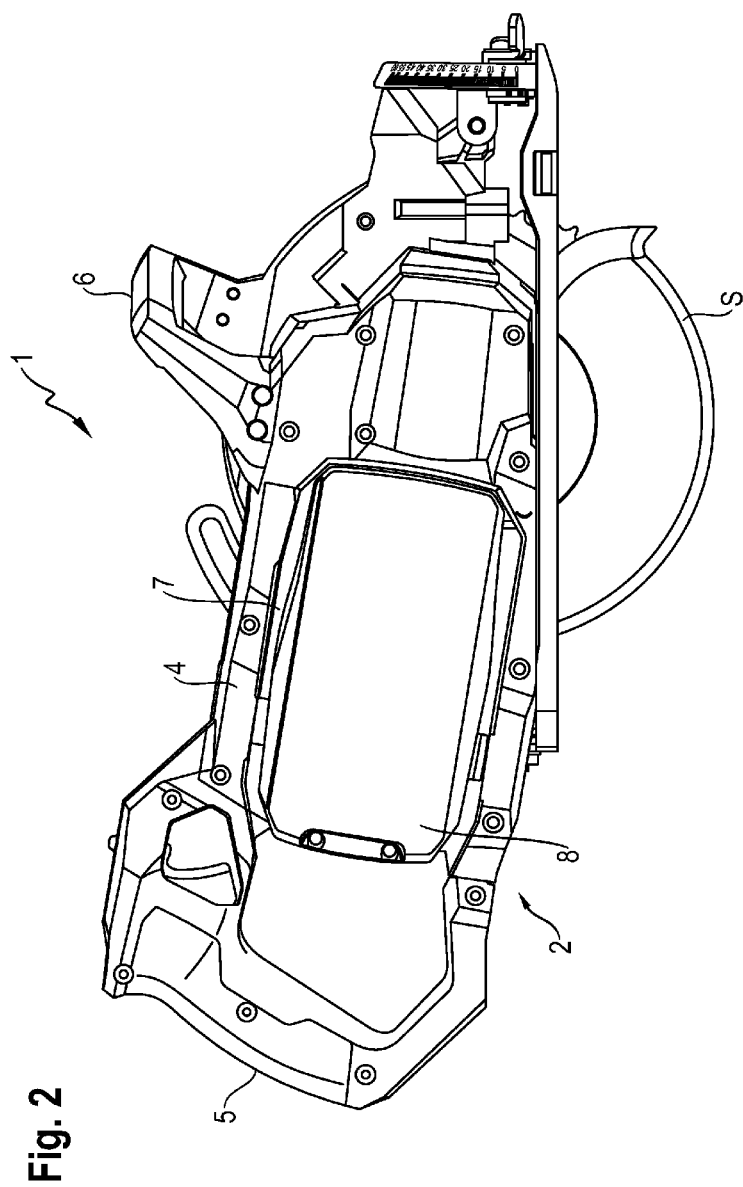
FIG. 2 shows a side view of the power tool, including the battery.
Figure 3:
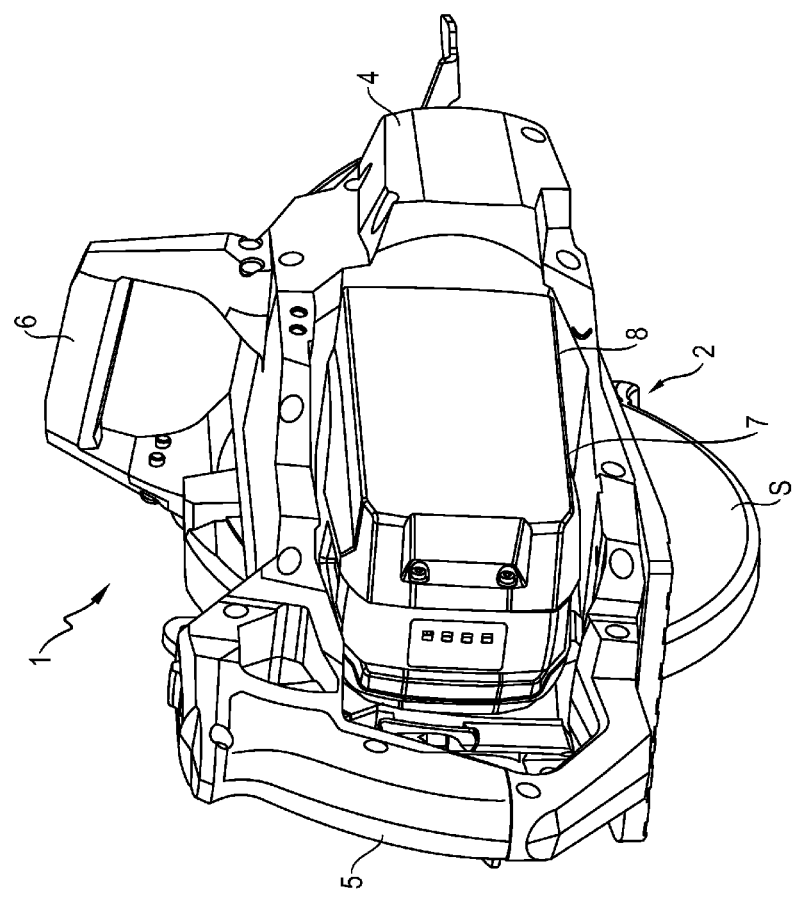
FIG. 3 shows another perspective view of the power tool, including the battery.

FIGS. 1 through 4 show a power tool 1 and a device 2 for accommodating at least one battery 8 on power tool 1, in particular a circular saw. However, it is also possible for it to be any other suitable power tool.

In the present embodiment, power tool 1 is designed in the form of a circular saw and essentially includes a housing 4, a first rear handle 5, a second upper handle 6 and a saw blade S. Power tool 1 designed as a circular saw may be guided by the user by the two handles 5, 6. The user is not illustrated in the figures.

Figure 5:
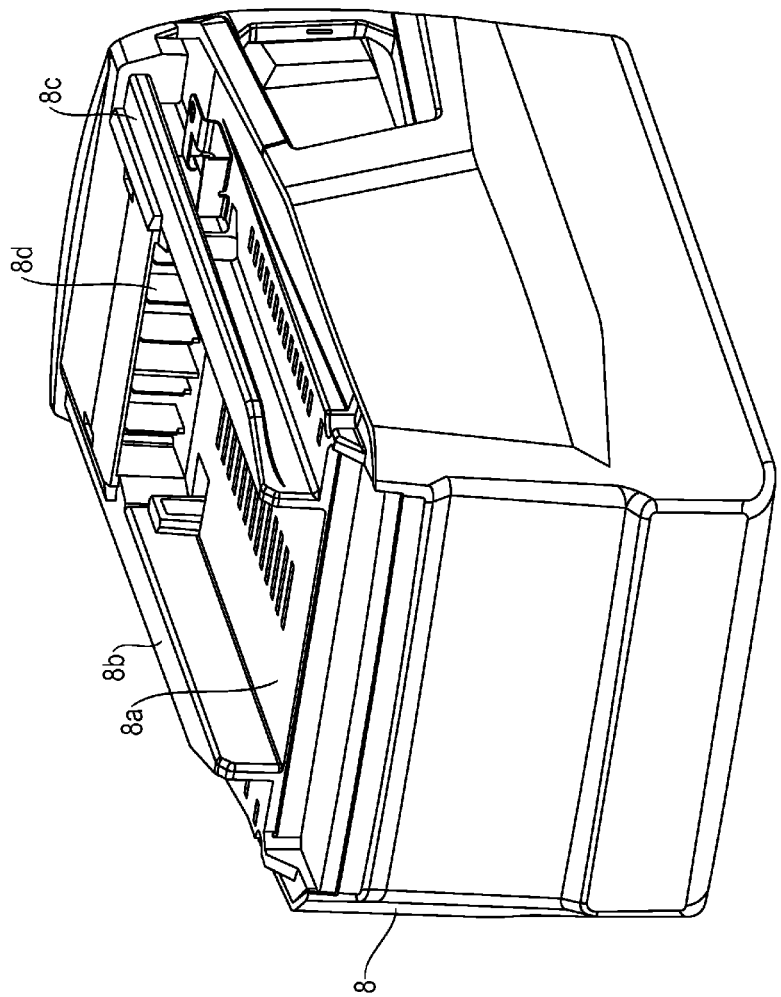
FIG. 5 shows a perspective view of the battery.

Housing 4 has an indentation 7, in which battery 8 may be accommodated and held. Indentation 7 may also be referred to as a recess. As shown in FIG. 5, battery 8 is designed in the shape of a cuboid. Two rails 8b, 8c and a contact element 8d are positioned on an upper side 8a. Rails 8b are used to be able to push battery 8 onto power tool 1 in a corresponding location.

Device 2 for accommodating at least one battery 8 on power tool 1 essentially includes a receiving plate 9 and a double hinge device 10.

As illustrated in FIGS. 6 through 18, receiving plate 9 is essentially designed in the form of a flat, shell-shaped plate. Receiving plate 9 is used for detachably holding battery 8 with the aid of indentation 7 of power tool 1. Receiving plate 9 has an upper side 9a, an underside 9b, a front side 9c, a back side 9d, a first side wall 9e and a second side wall 9f. A contact device 11 is furthermore positioned on upper side 9a of receiving plate 9.

Figure 19:
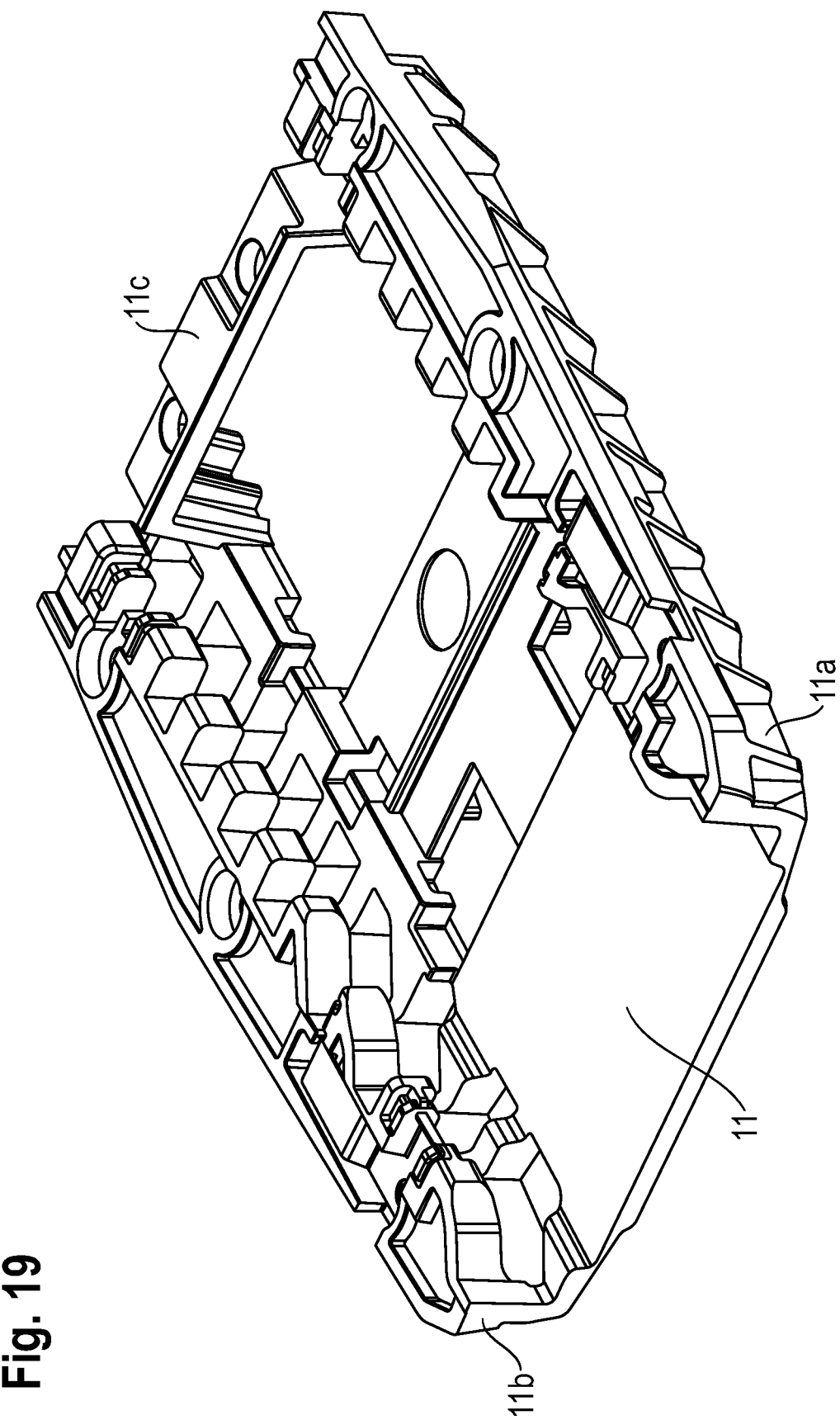
FIG. 19 shows a perspective view of the contact device.
Figure 20:
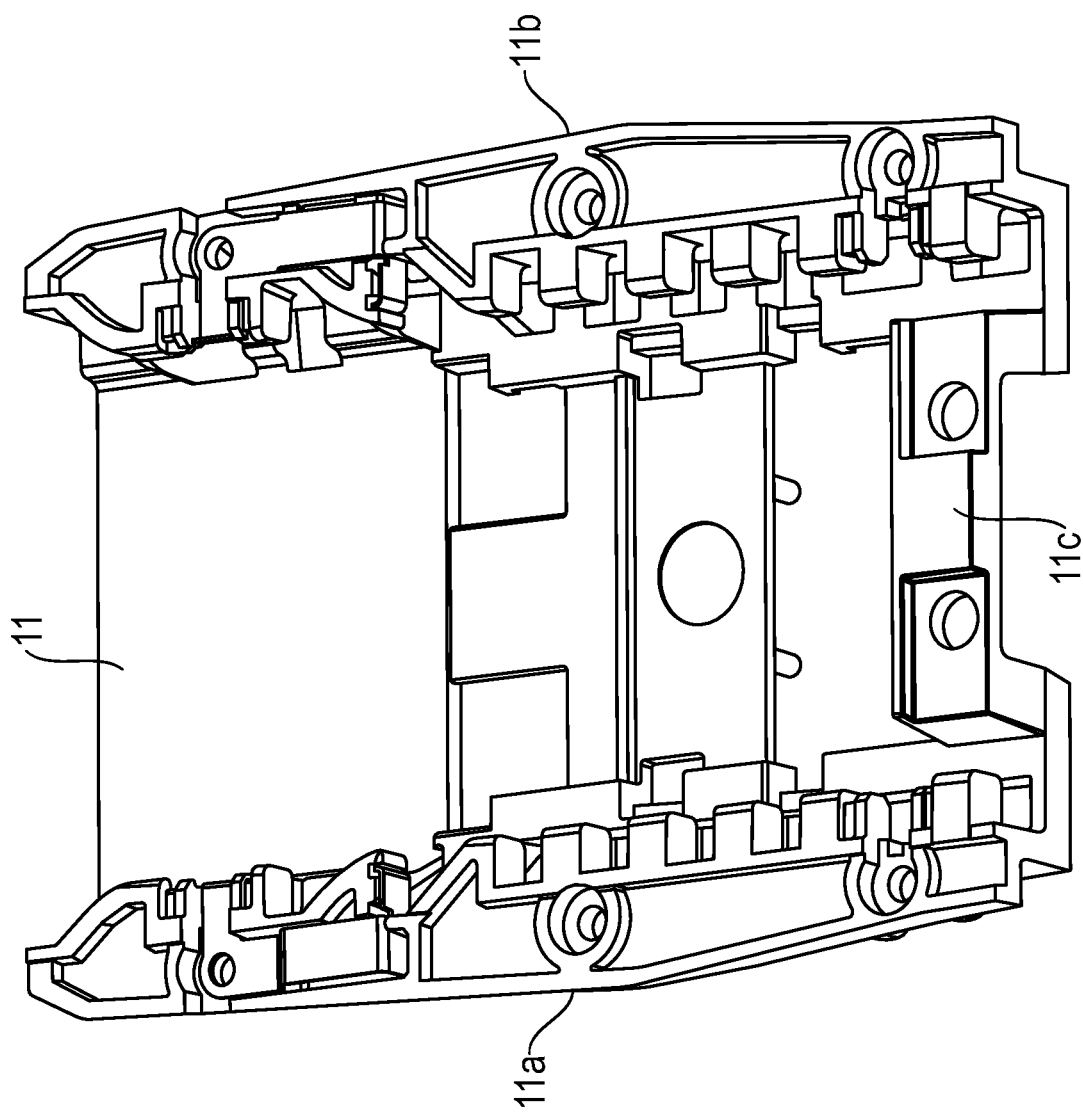
FIG. 20 shows another perspective view of the contact device.
Figure 21:
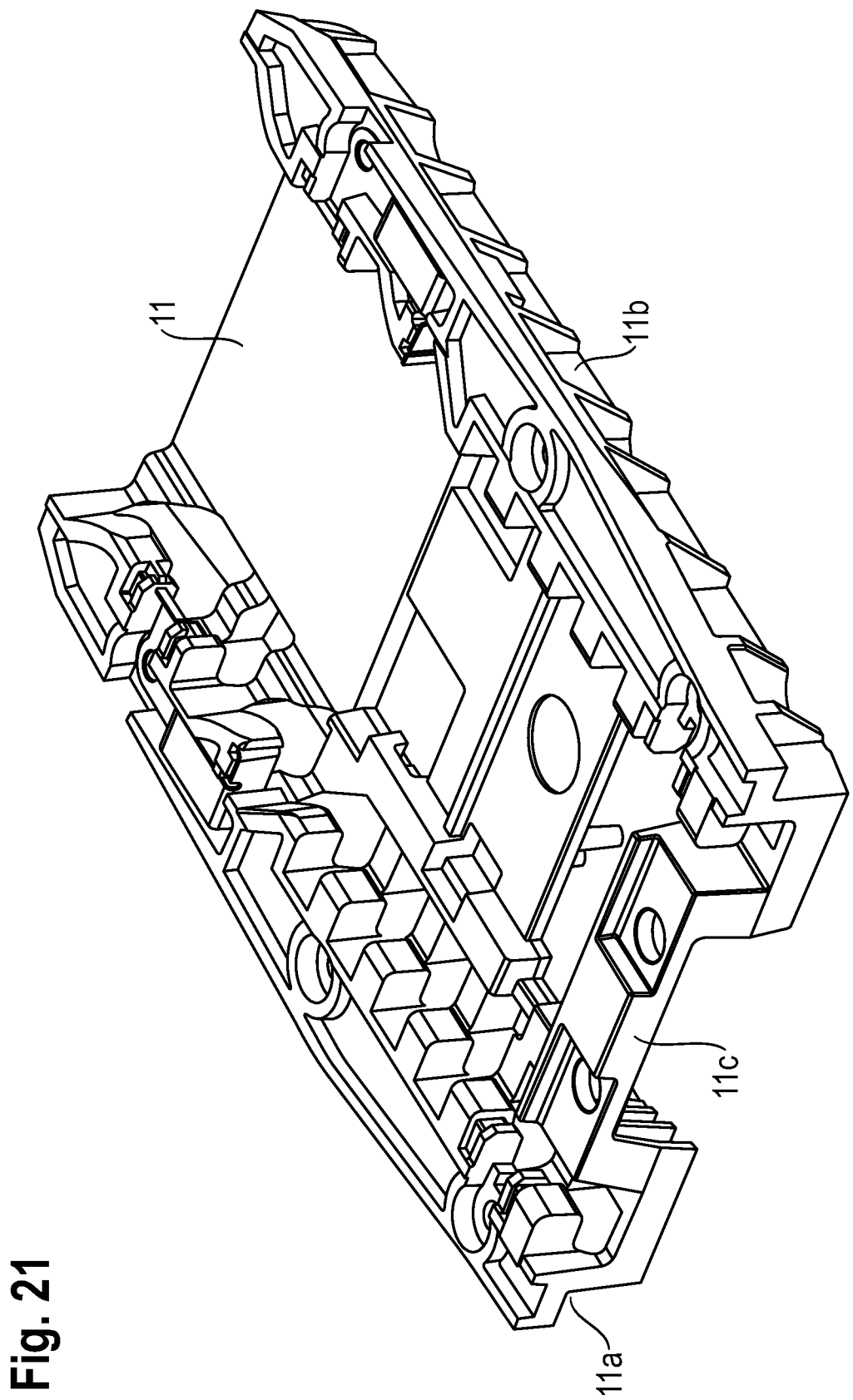
FIG. 21 shows another perspective view of the contact device.

As illustrated in FIGS. 19 through 21, contact device 11 has a flat design and includes two recesses 11a, 11b and a connecting element 11c. Accordingly, the two rails 8b, 8c of battery 8 may be inserted into the two recesses 11a, 11b, so that battery 8 is detachably fastened on contact device 11 and on receiving plate 9. When battery 8 is pushed all the way onto contact device 11, contact element 8d on upper side 8a of battery 8 is in contact with connecting element 11c of contact device 11. Contact device 11 includes both mechanical and electrical contact elements.

Figure 6:
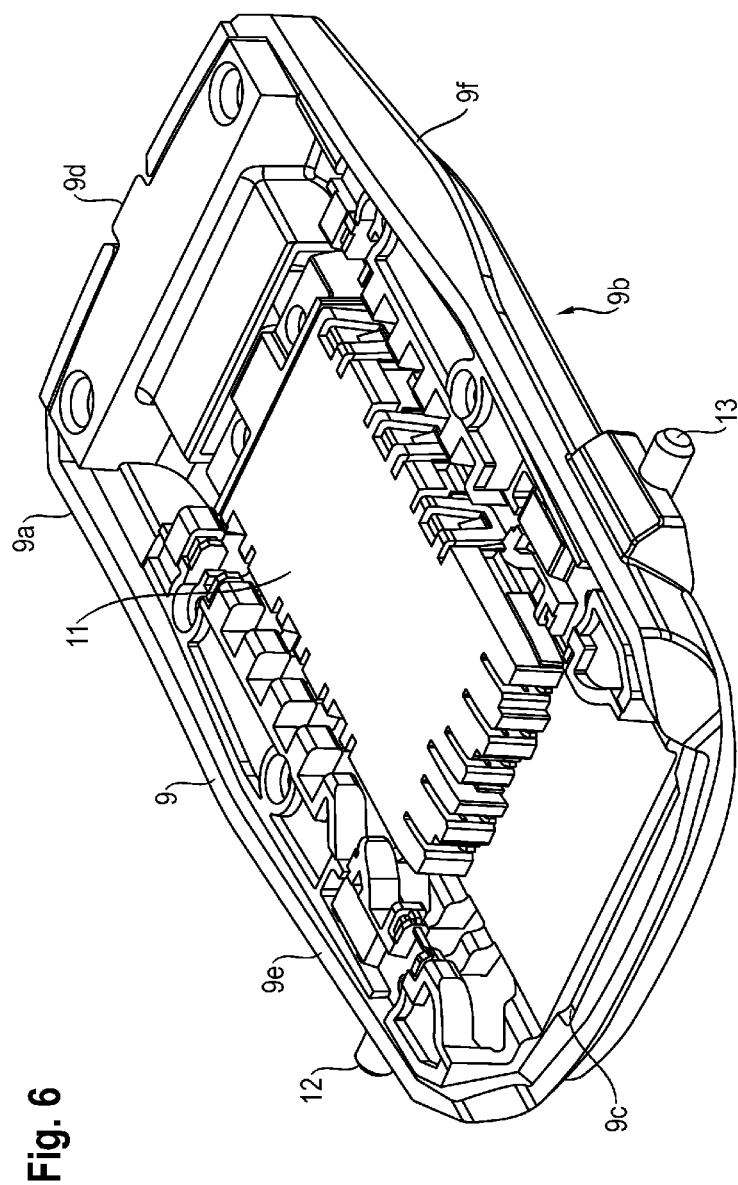
FIG. 6 shows a perspective view of a receiving plate, including a contact device of a device according to the present invention for accommodating at least one battery on a power tool.
Figure 7:
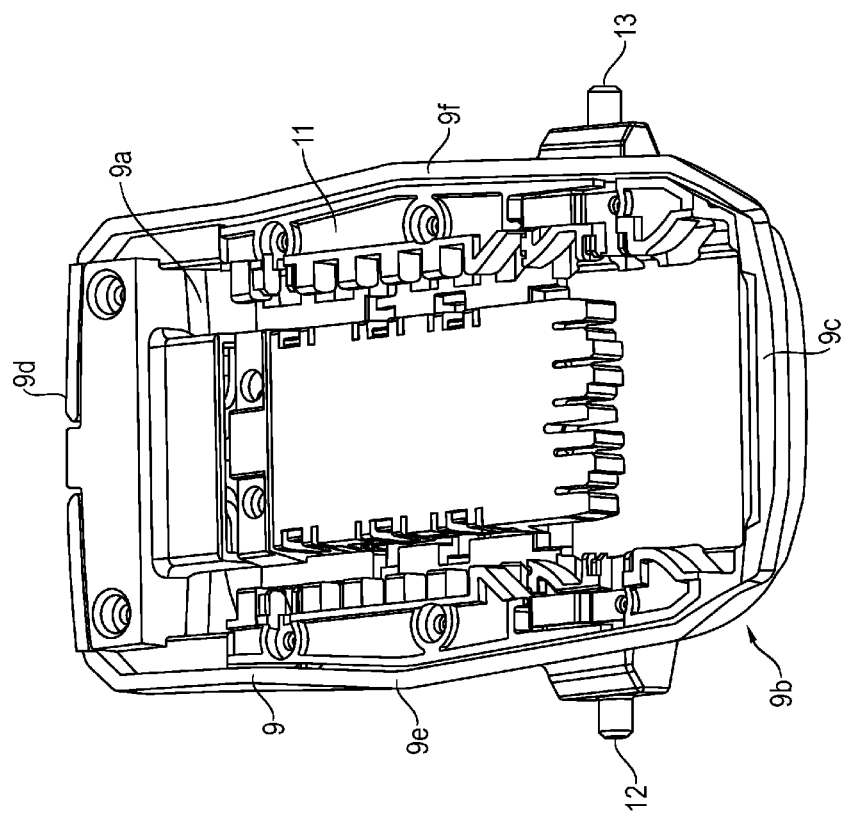
FIG. 7 shows another perspective view of the receiving plate, including the contact device of the device according to the present invention for accommodating at least the battery on a power tool.
Figure 8:
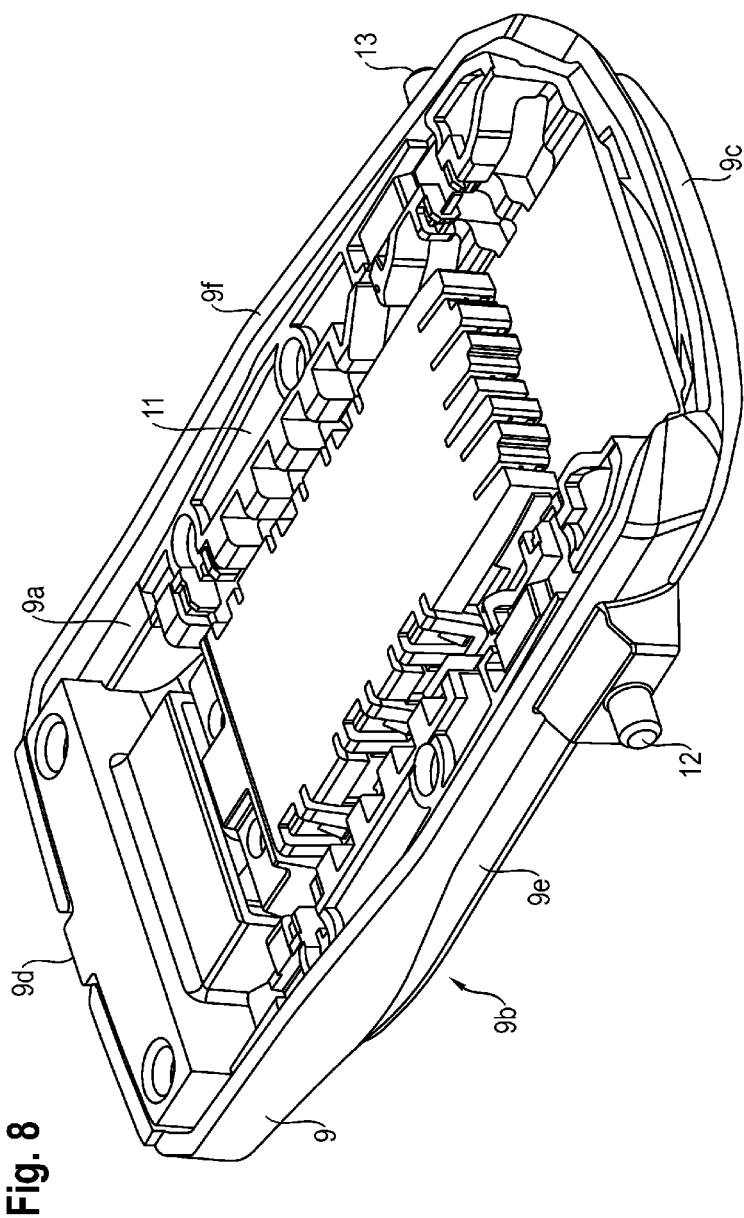
FIG. 8 shows another perspective view of the receiving plate, including the contact device of the device according to the present invention for accommodating at least the battery on the power tool.
Figure 9:
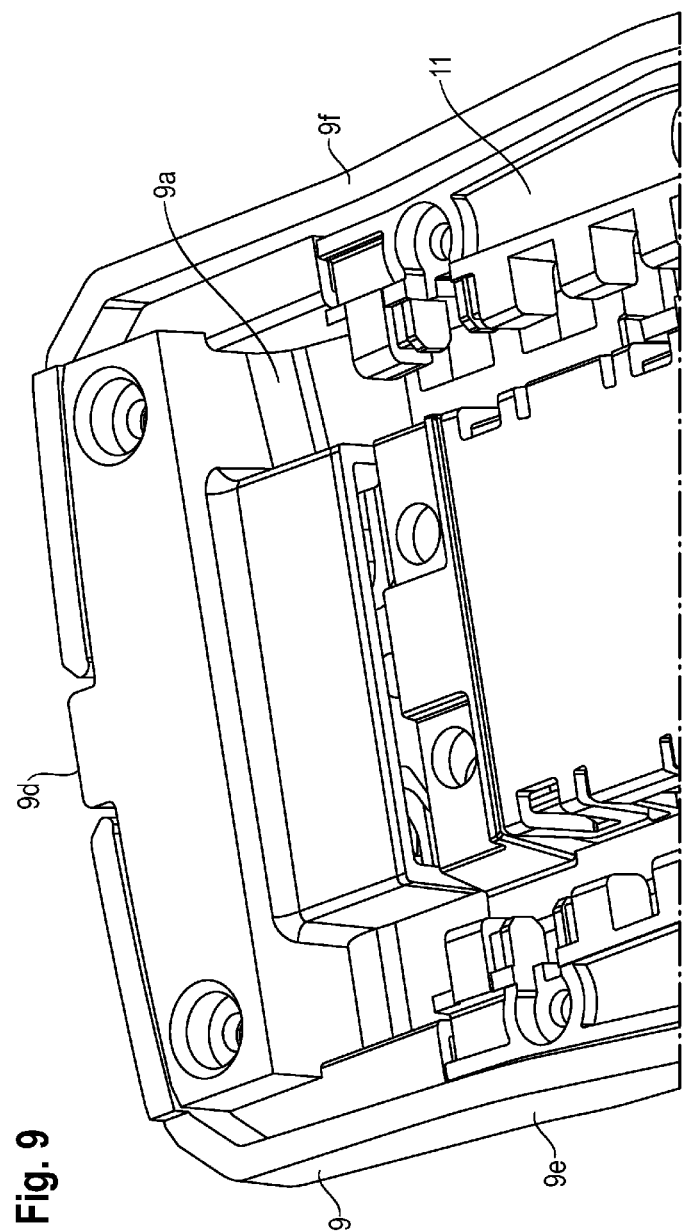
FIG. 9 shows a partial view of a rear end of the receiving plate, including the contact device.
Figure 10:
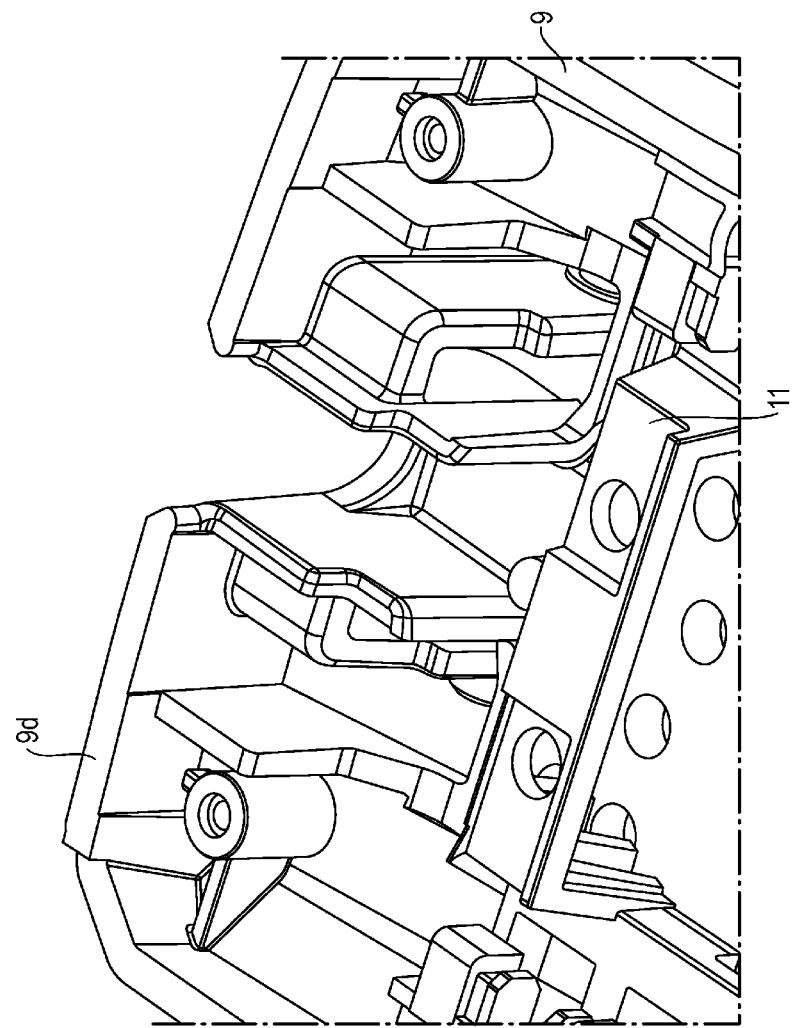
FIG. 10 shows another partial view of the rear end of the receiving plate, including part of the contact device.
Figure 11:
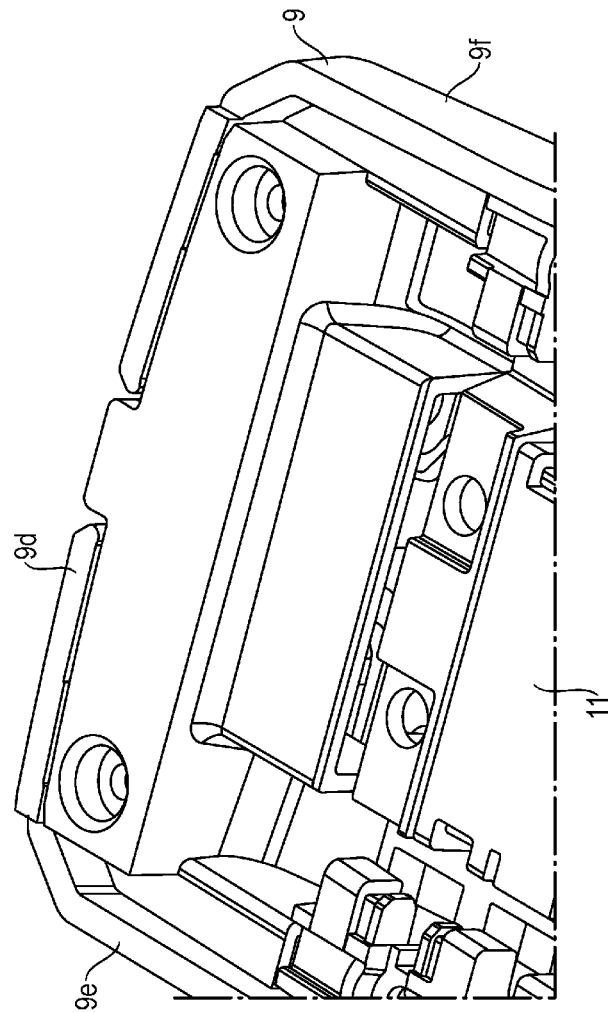
FIG. 11 shows another partial view of the rear end of the receiving plate, including part of the contact device.
Figure 12:
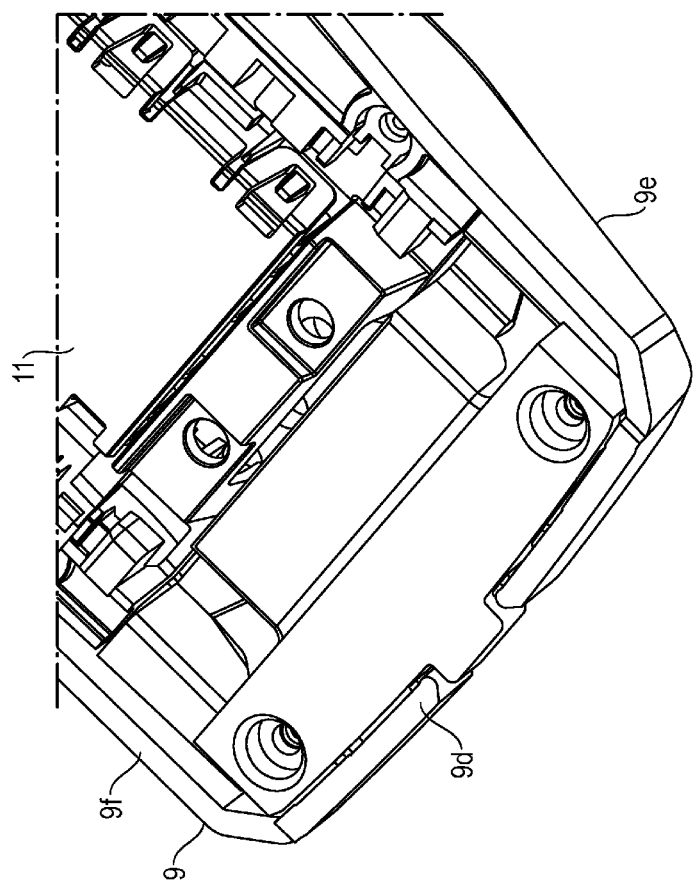
FIG. 12 shows another partial view of the rear end of the receiving plate, including part of the contact device.
Figure 13:
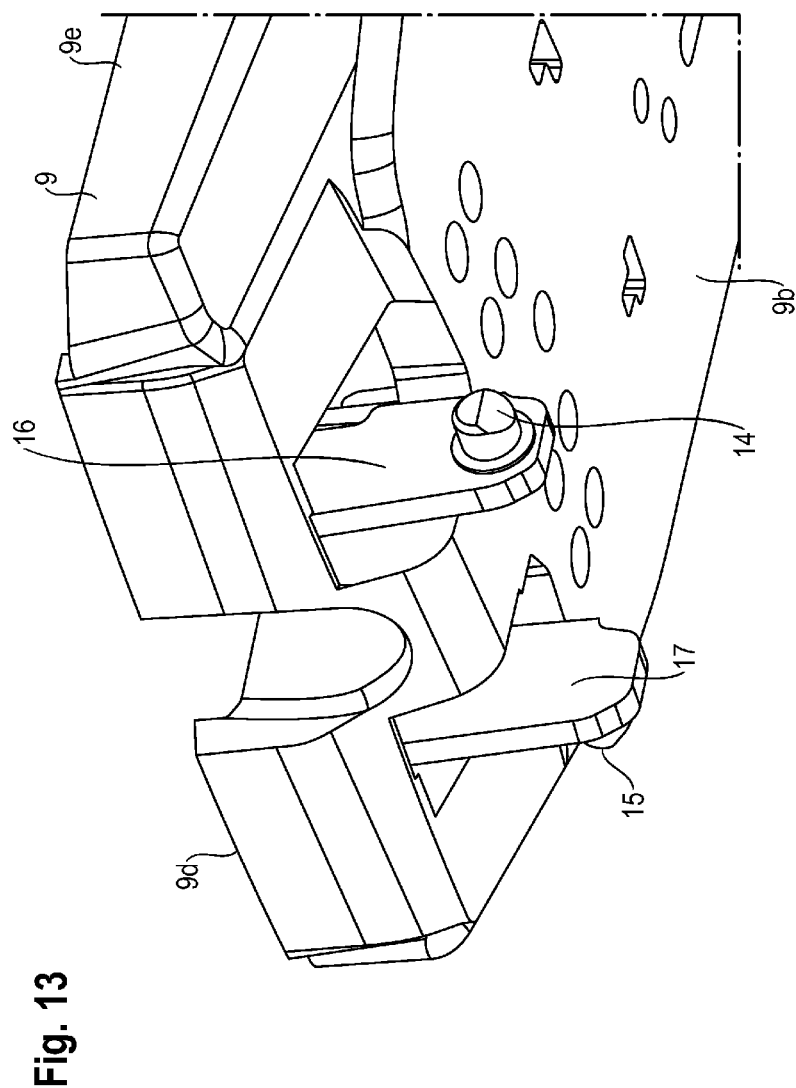
FIG. 13 shows a view from below of the rear end of the receiving plate, without the contact device.
Figure 14:
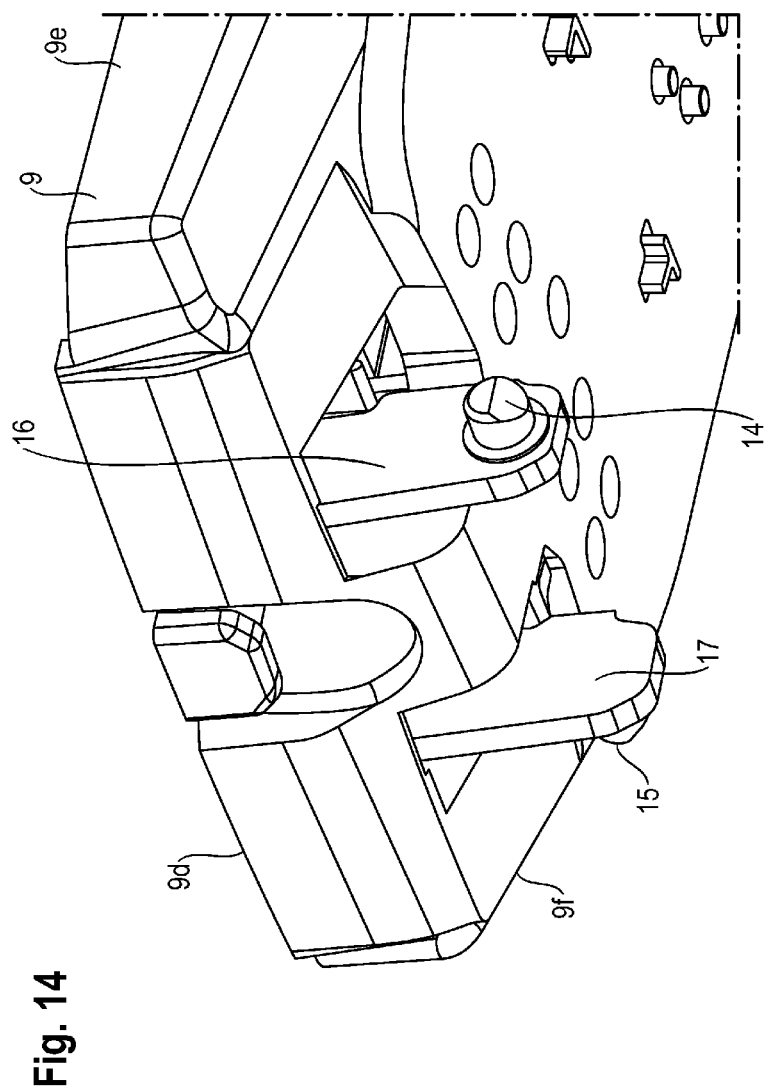
FIG. 14 shows another view from below of the rear end of the receiving plate, including part of the contact device.
Figure 15:
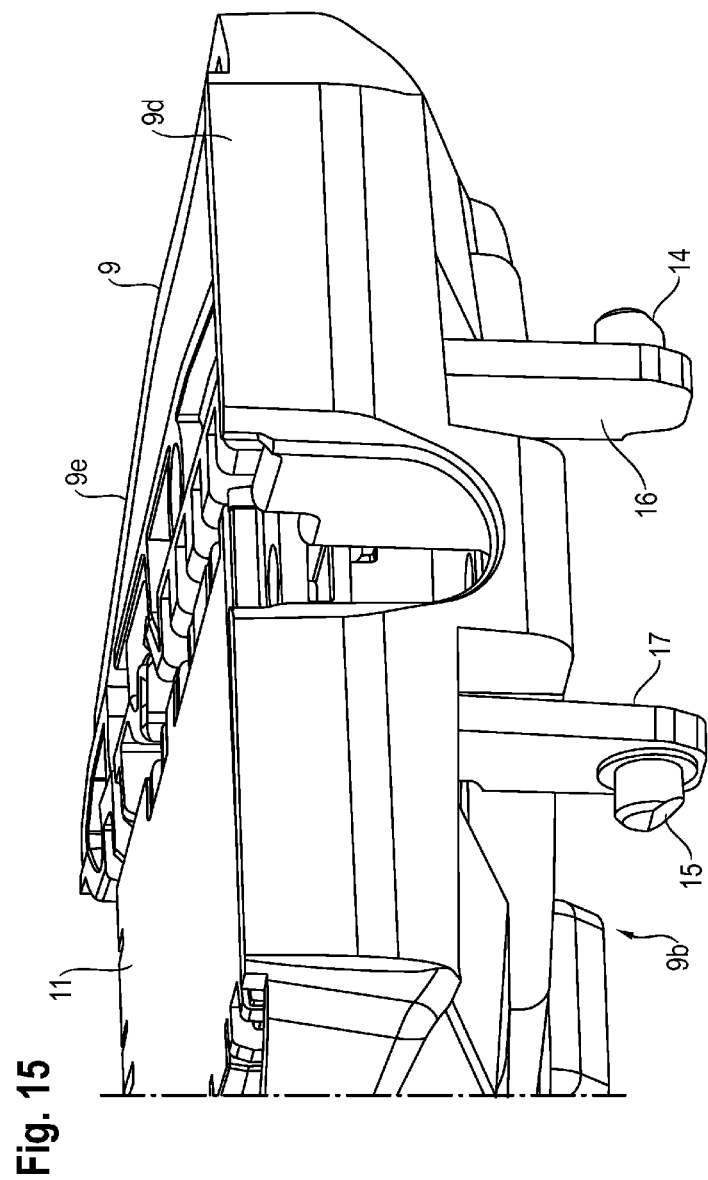
FIG. 15 shows another partial view of the rear end of the receiving plate, including part of the contact device.
Figure 16:
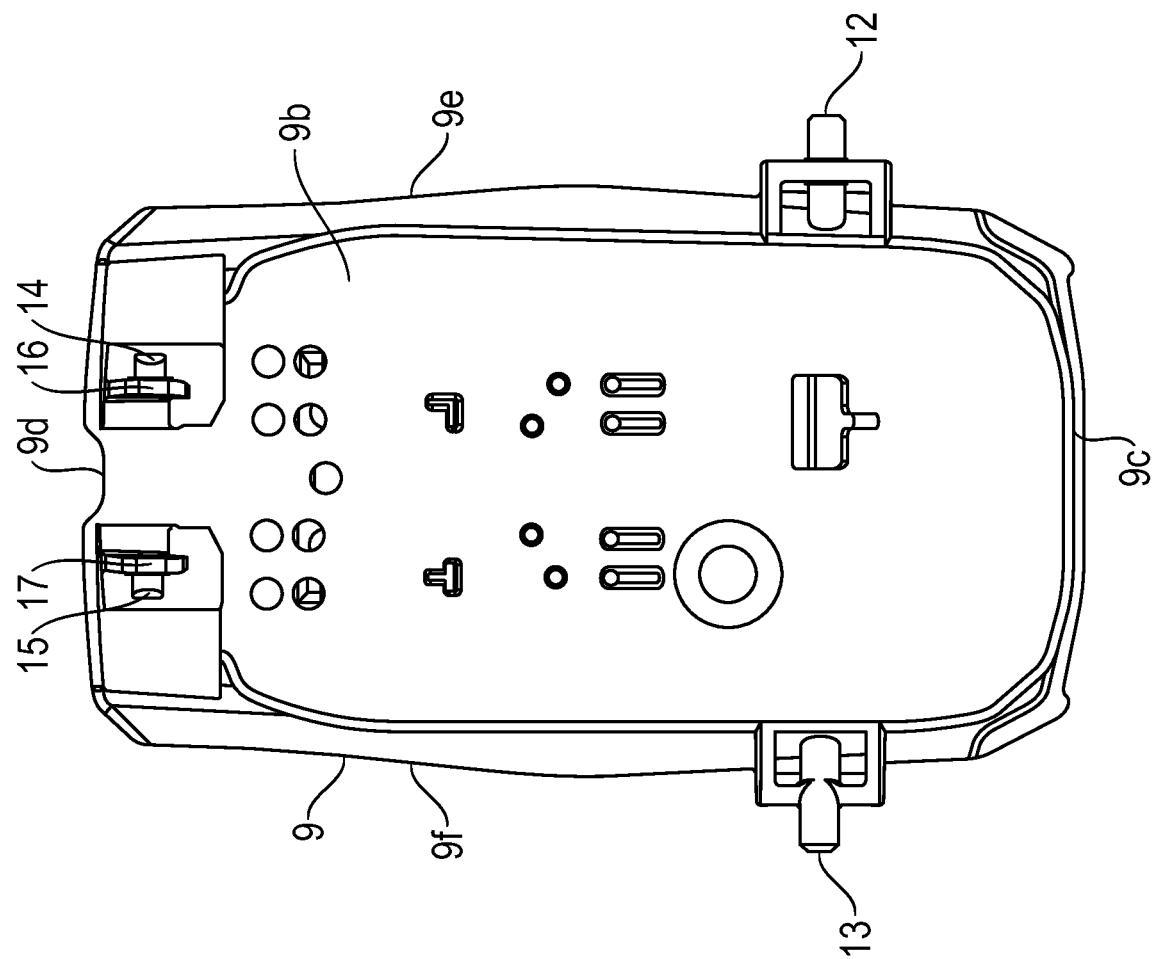
FIG. 16 shows a view from below of the entire receiving plate, including the contact device.
Figure 17:
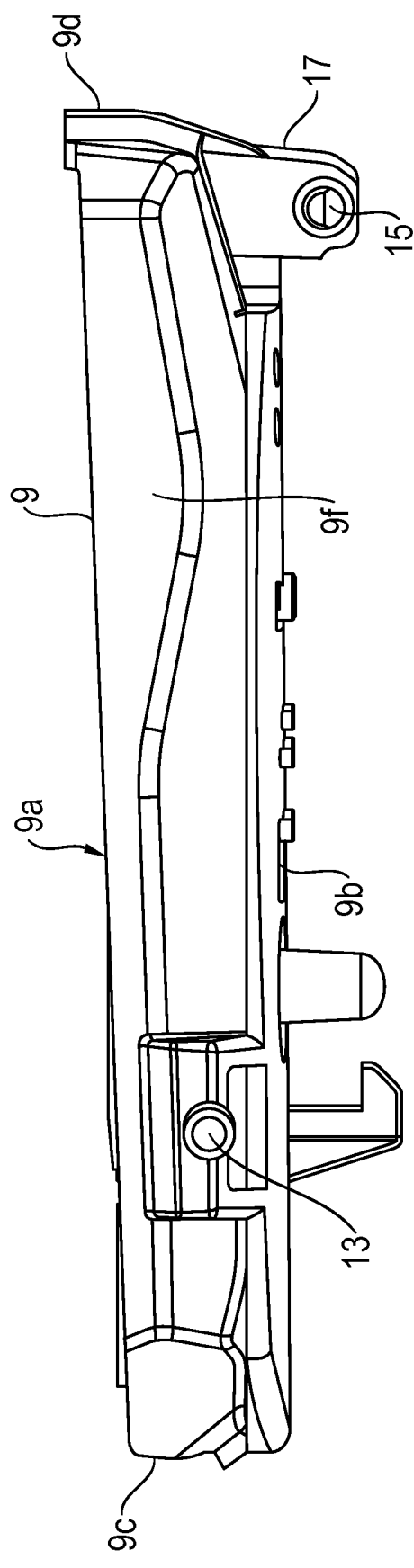
FIG. 17 shows a side view of the entire receiving plate, including the contact device.
Figure 18:
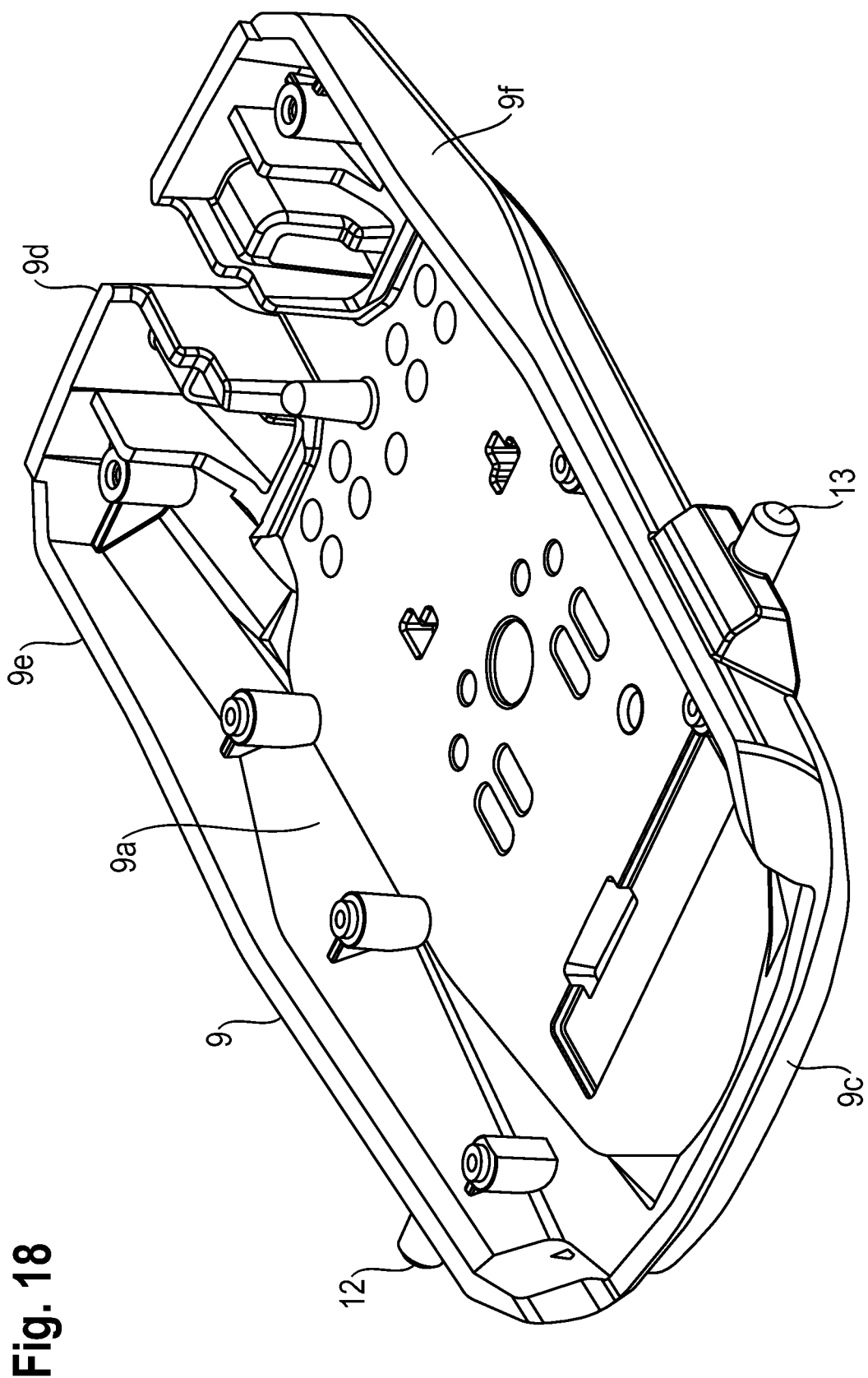
FIG. 18 show another perspective view of the receiving plate, without the contact device.

In addition, receiving plate 9 contains a first and a second guide pin 12, 13 (cf. FIG. 6). First guide pin 12 is positioned on first side wall 9e, and second guide pin 13 is positioned on second side wall 9f. Both first and second guide pins 12, 13 extend in the same plane as the flat, shell-shaped plate of receiving plate 9 or contact device 11 (cf. FIGS. 6 through 9). Moreover, receiving plate 9 contains a third and a fourth guide pin 14, 15 on underside 9b. Third guide pin 14 is positioned on an end of a first web 16, and fourth guide pin 15 is positioned on an end of a second web 17. First and second webs 16, 17 run in a plane perpendicular to the plane of receiving plate 9 and contact device 11 (cf. FIGS. 14 and 15).

Figure 28:
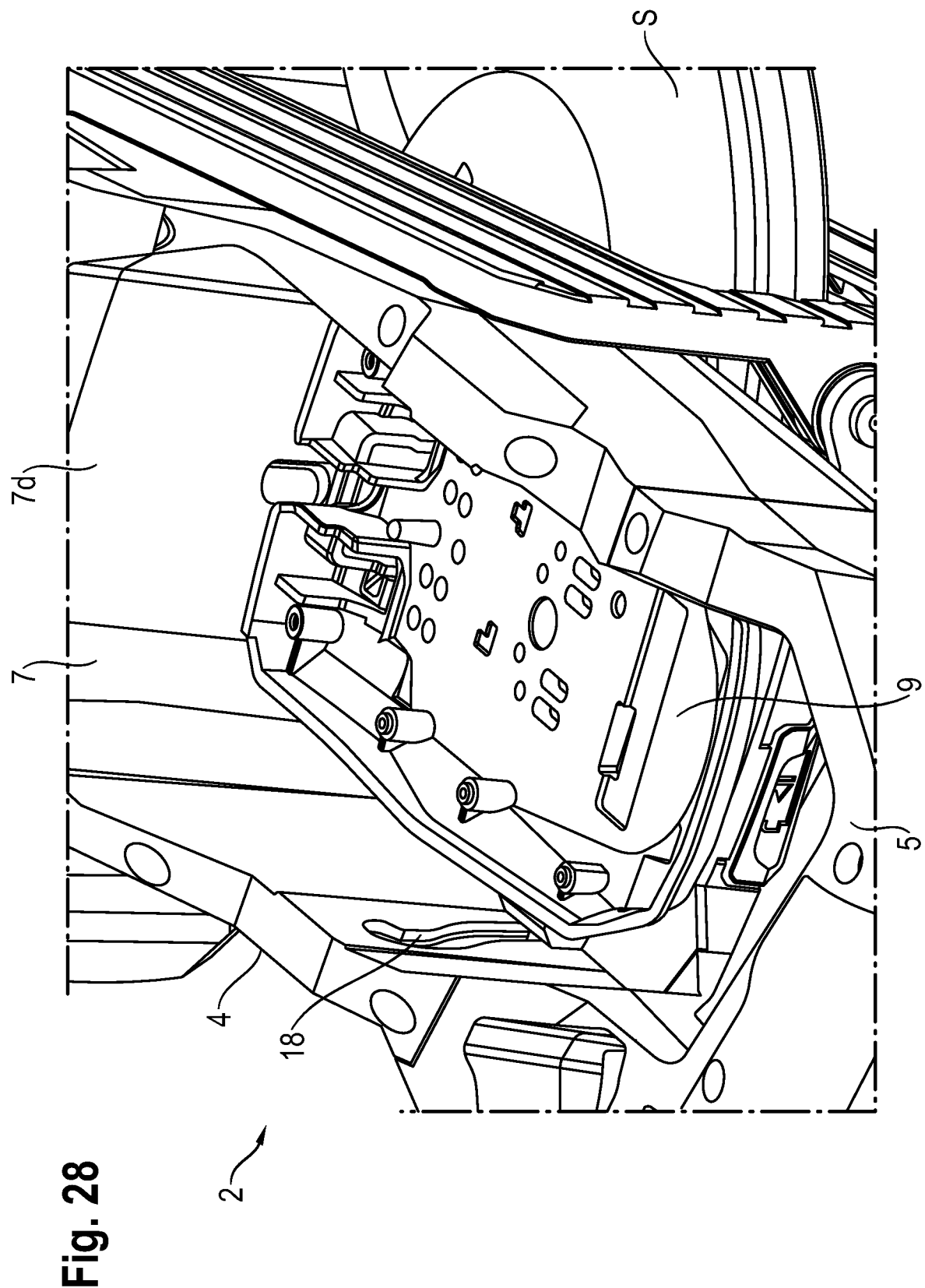
FIG. 28 shows another perspective view of the housing of the power tool, including the receiving plate in the first position.
Figure 29:
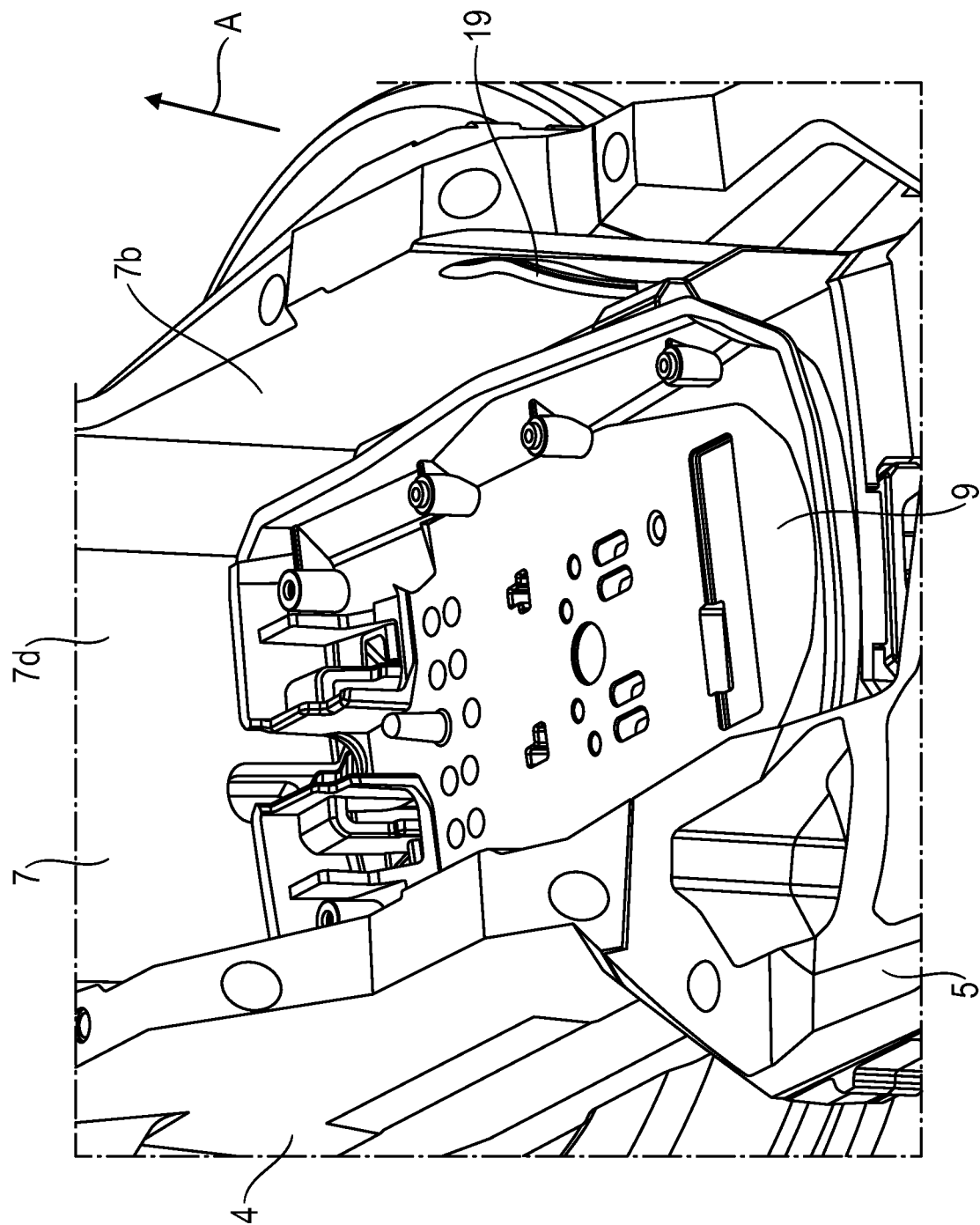
FIG. 29 shows another perspective view of the housing of the power tool, including the receiving plate in the first position.
Figure 30:
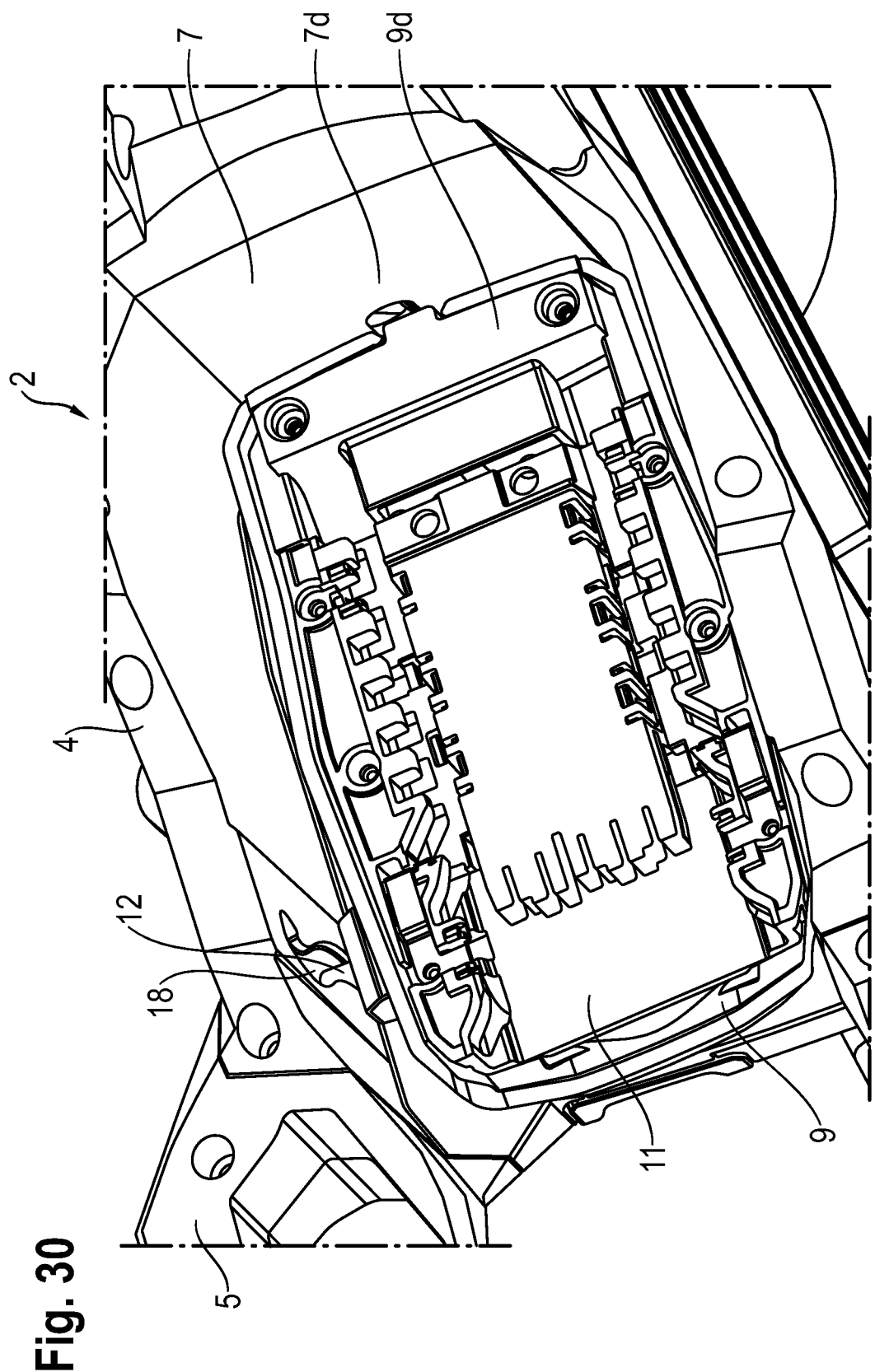
FIG. 30 shows another perspective view of the housing of the power tool, including the receiving plate and the contact device in the first position.
Figure 31:
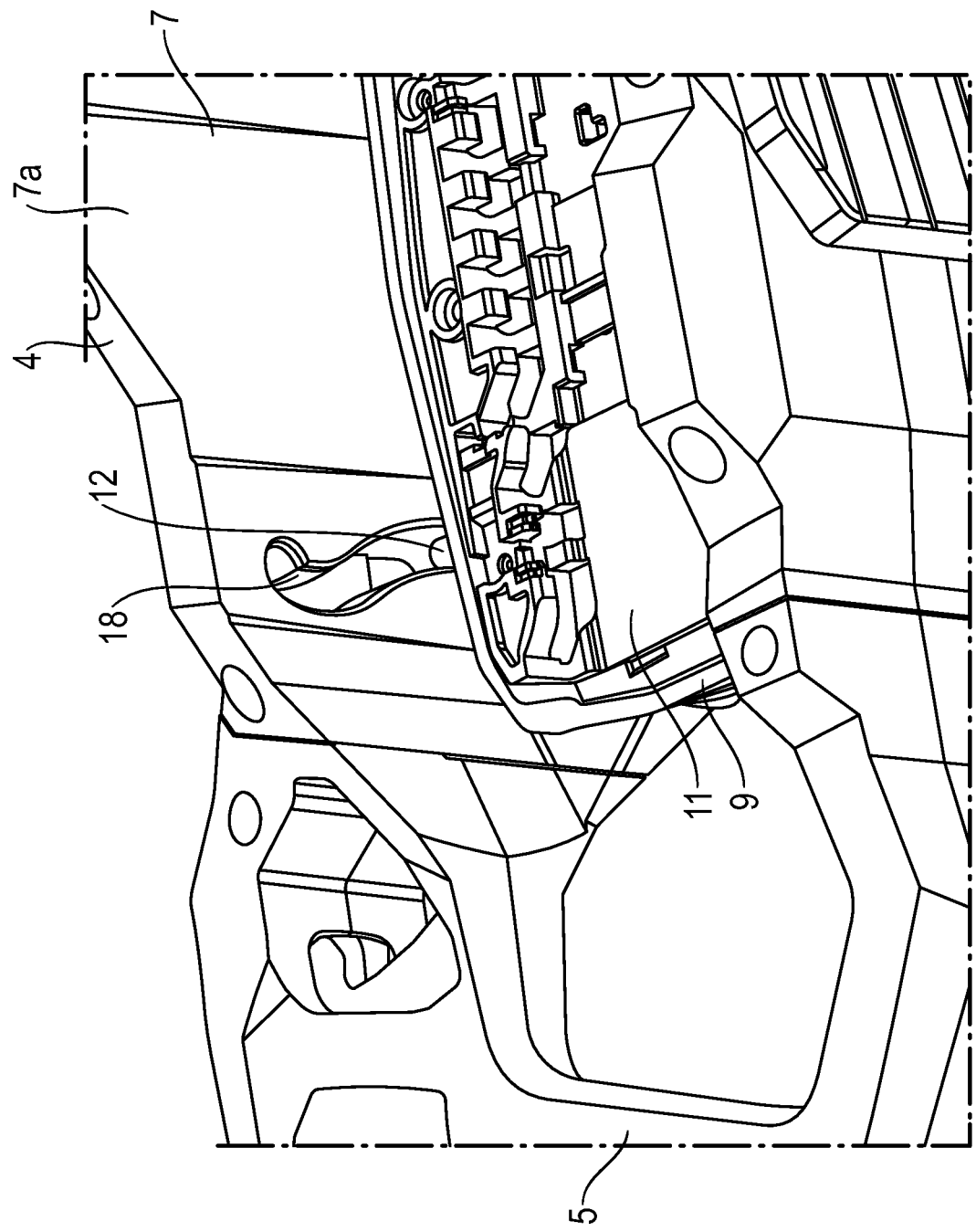
FIG. 31 shows a perspective partial view of the housing of the power tool, including the receiving plate and the contact device in the first position.
Figure 32:
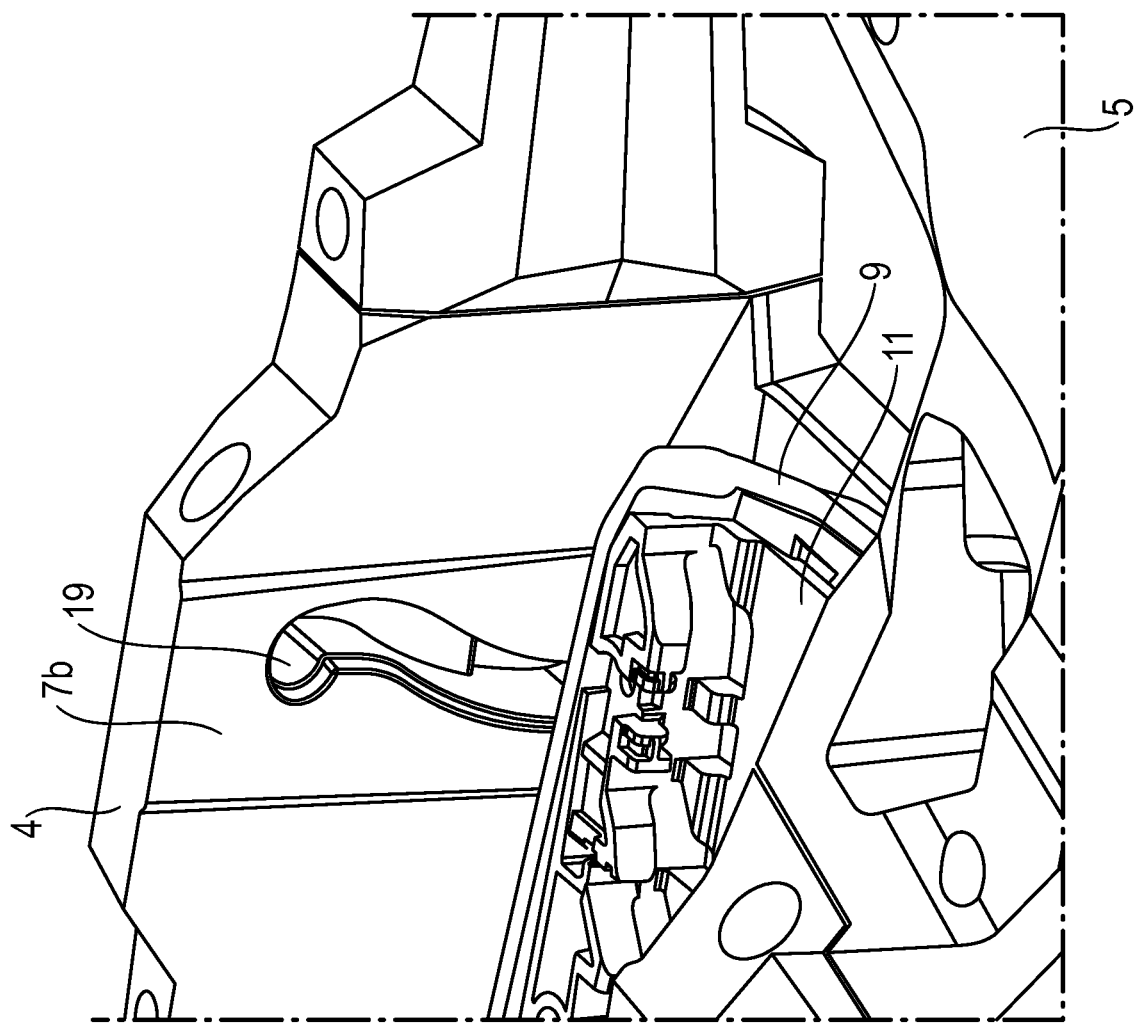
FIG. 32 shows another perspective partial view of the housing of the power tool, including the receiving plate and the contact device in the first position.
Figure 33:
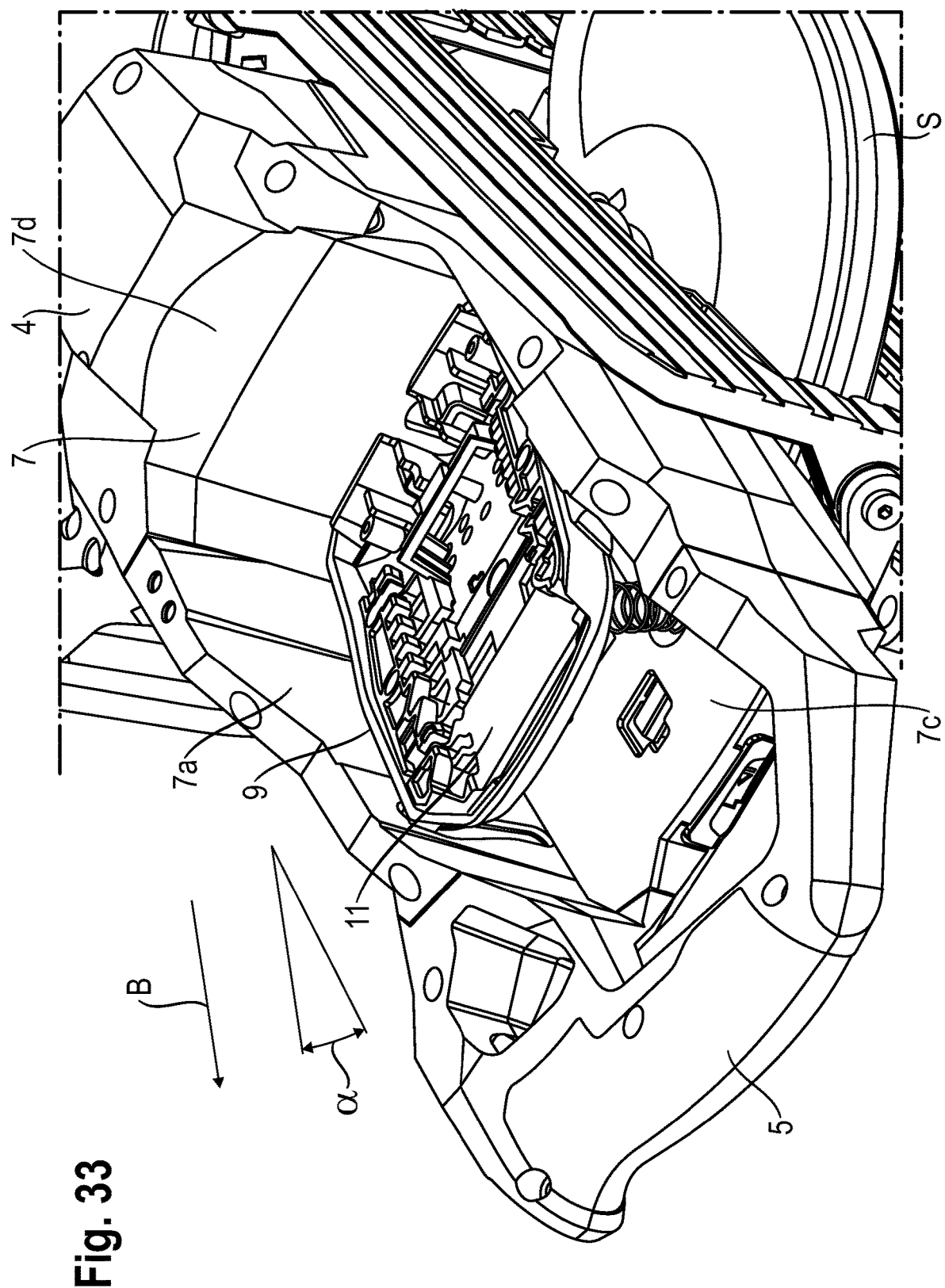
FIG. 33 shows a perspective view of the housing of the power tool, including the receiving plate and the contact device in the second position.

As already mentioned above, housing 4 of power tool 1 has an indentation 7, in which battery 8 may be accommodated and held with the aid of receiving plate 9. As described in greater detail below, receiving plate 9 may be reversibly pivoted relative to indentation 7 between a first and a second position. For example, FIG. 28 shows receiving plate 9 in the first position, and FIG. 33 shows receiving plate 9 in the second position.

Indentation 7 essentially contains a first side wall 7a, a second side wall 7b, a base 7c and a back wall 7d (cf. FIGS. 22 through 30). Indentation 7 accommodates battery 8 in that receiving plate 9 is positioned in indentation 7, and battery 8 is pushed onto receiving plate 9. Indentation 7 is dimensioned in such a way that receiving plate 9 and at least part of battery 8 may be accommodated. Base 7c of indentation 7 is in parallel to upper side and underside 9a, 9b of receiving plate 9 when receiving plate 9 is in the first position. In the first position, receiving plate 9 is also in parallel to saw blade S (cf. FIGS. 27 and 28). First side wall 7a of indentation 7 contains a first guide groove 18, and second side wall 7b of indentation 7 contains a second guide groove 19. First guide groove 18 is designed to accommodate and guide first guide pin 12, and second guide groove 19 is designed to accommodate and guide second guide pin 13. Both first and second guide grooves 18, 19 have a slightly S-shaped course. Moreover, indentation 7 has a recess 20 on one end of the base, in which a connecting element 21 of double hinge device 10 is positioned. Double hinge device 10 has a first and a second rotation axis A, B, first rotation axis A being positioned on a housing 4 of power tool 1, and second rotation axis B being positioned on receiving plate 9, so that receiving plate 9 is reversibly pivotable between a first and a second position relative to housing 4 around first as well as second rotation axis A, B.

Connecting element 21 includes a first and a second pivot bearing 22, 23 for correspondingly accommodating third and fourth guide pins 14, 15 of receiving plate 9. As is apparent in FIG. 22, first rotation axis A is situated on base 7c of indentation 7, so that connecting element 21 may be pivoted between the first and the second position relative to base 7c of indentation 7 (cf. FIGS. 22 and 25).

Second rotation axis B is formed by first and second pivot bearings 22, 23 as well as by third and fourth guide pins 14, 15. Connecting element 21 and receiving plate 9 may be pivoted relative to each other with the aid of second rotation axis B.

Figure 22:
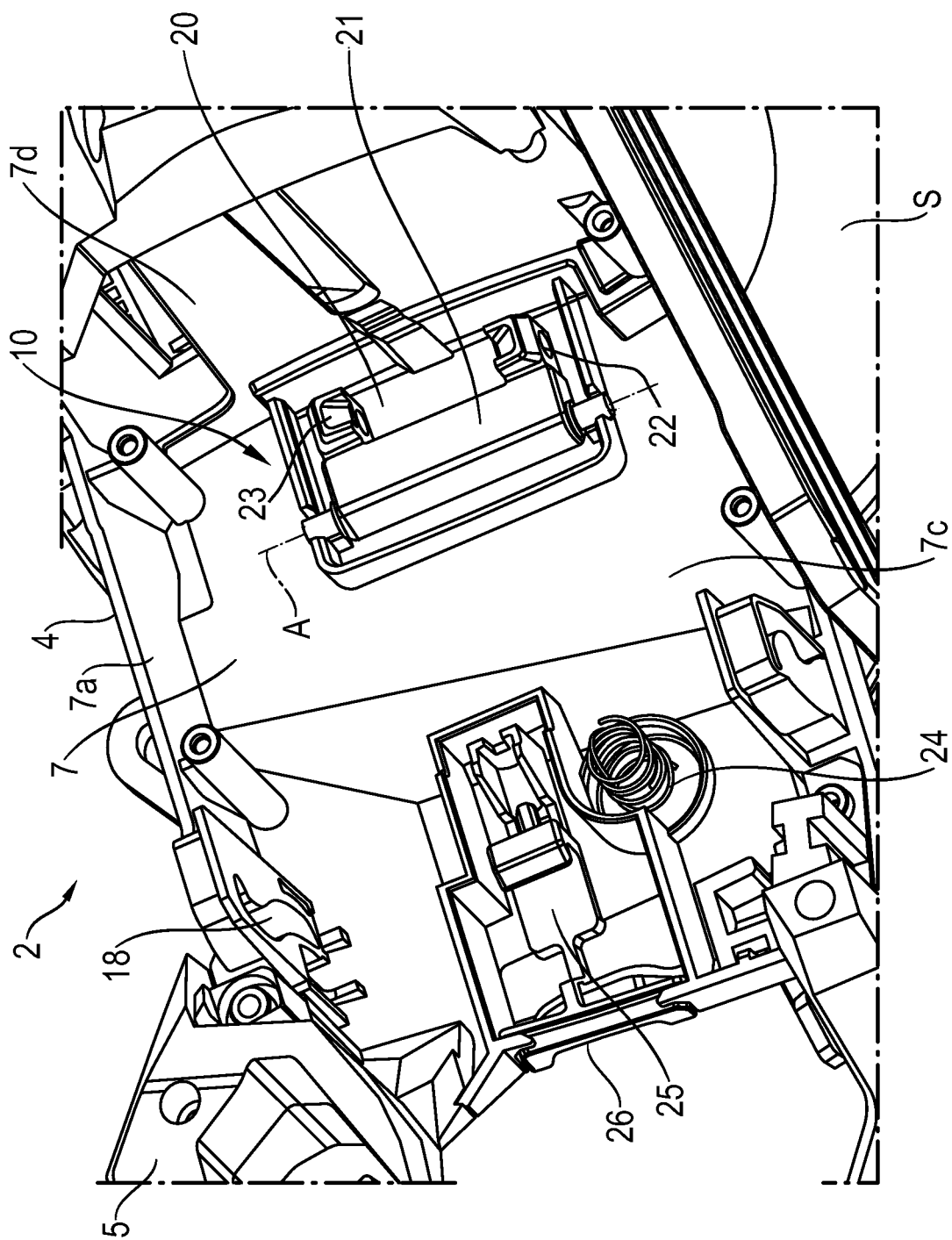
FIG. 22 shows a perspective partial view of a housing of the power tool.
Figure 23:
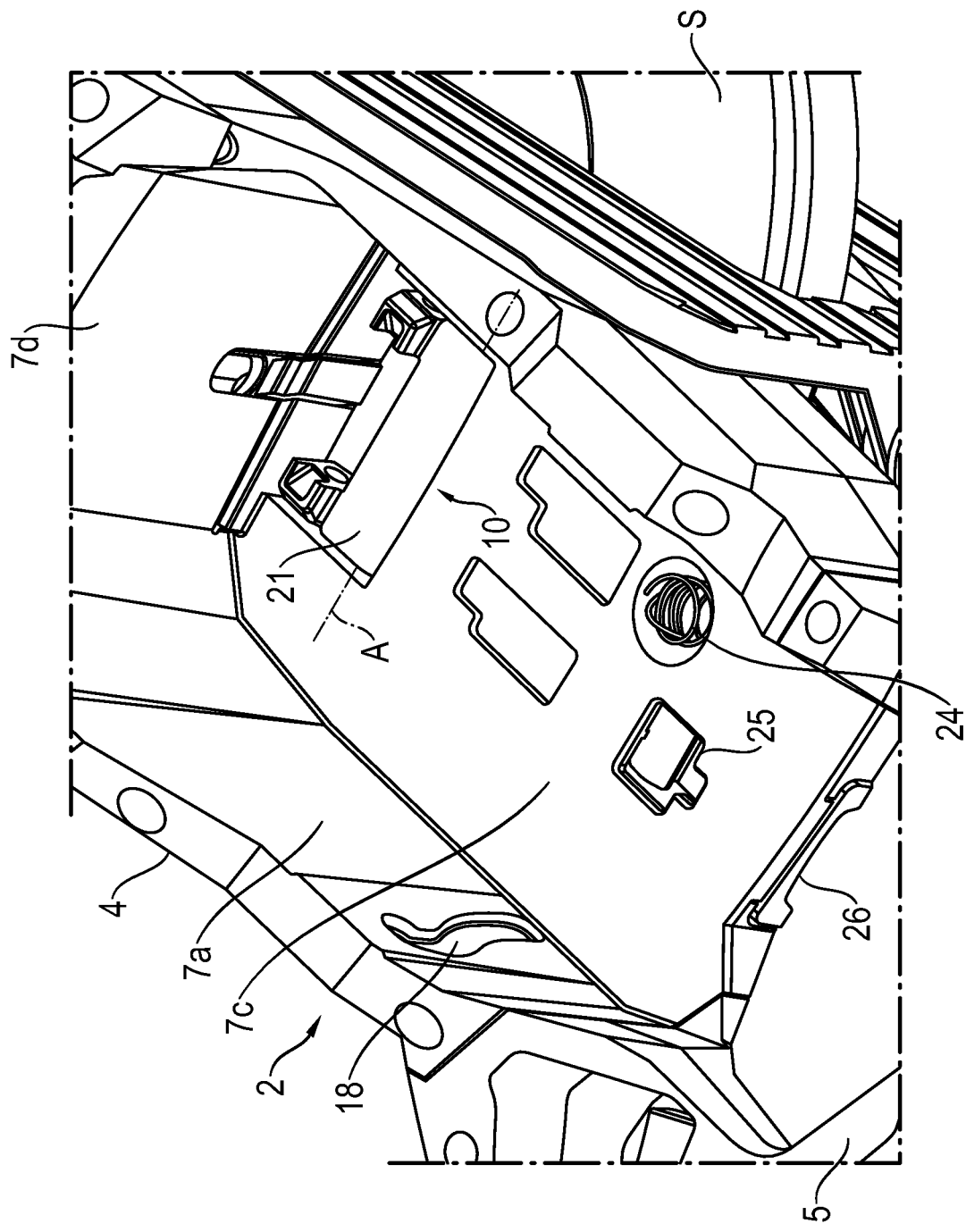
FIG. 23 shows another perspective partial view of the housing of the power tool, including a double hinge device in a first position.
Figure 24:
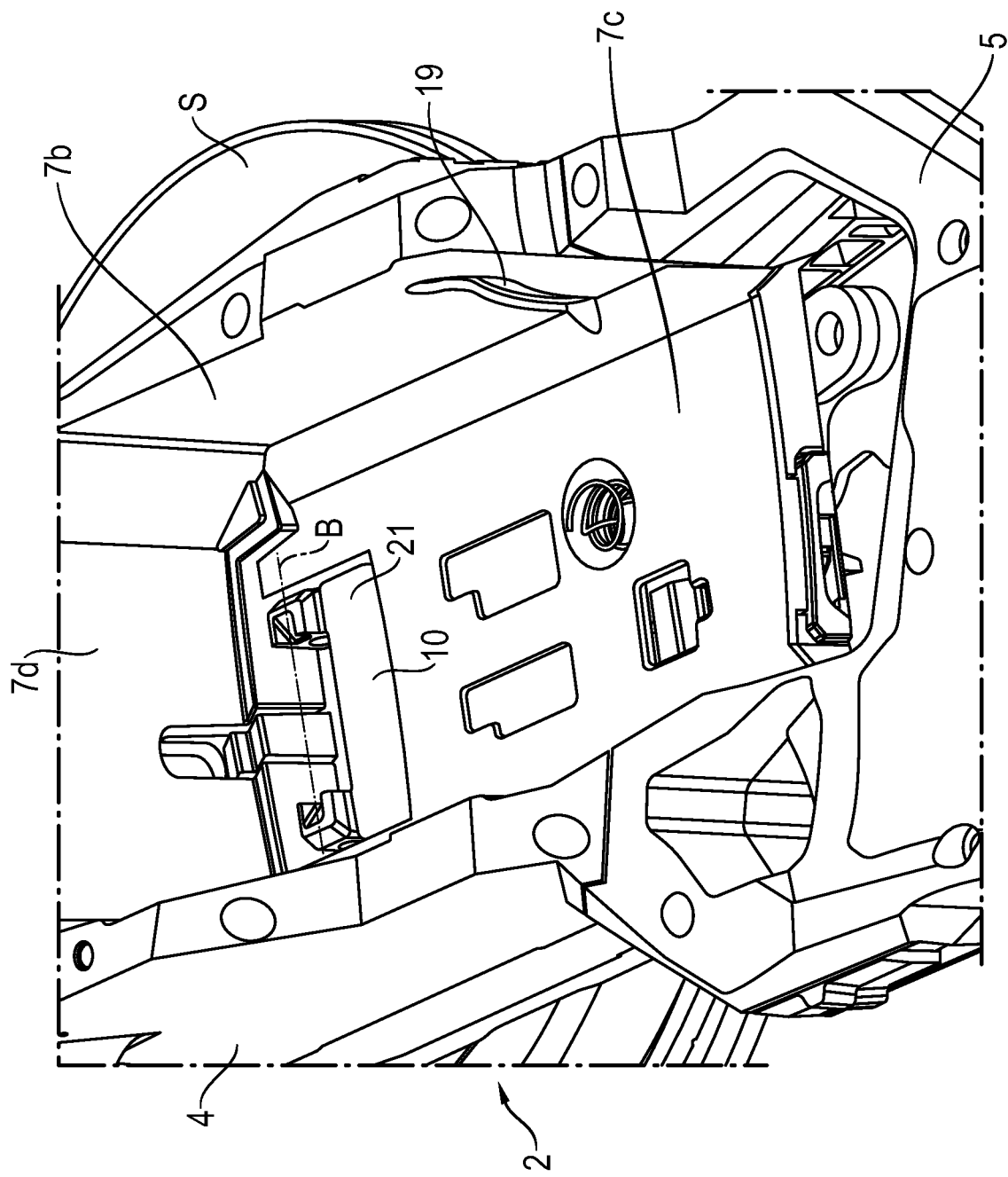
FIG. 24 shows another perspective partial view of the housing of the power tool, including a double hinge device in a first position.

In FIGS. 22 through 24, connecting element 21 of double hinge device 10 is shown in the first position. In the first position, connecting element 21 lies flat against base 7c of indentation 7 and almost completely fills recess 20 on base 7c of indentation 7.

Figure 25:
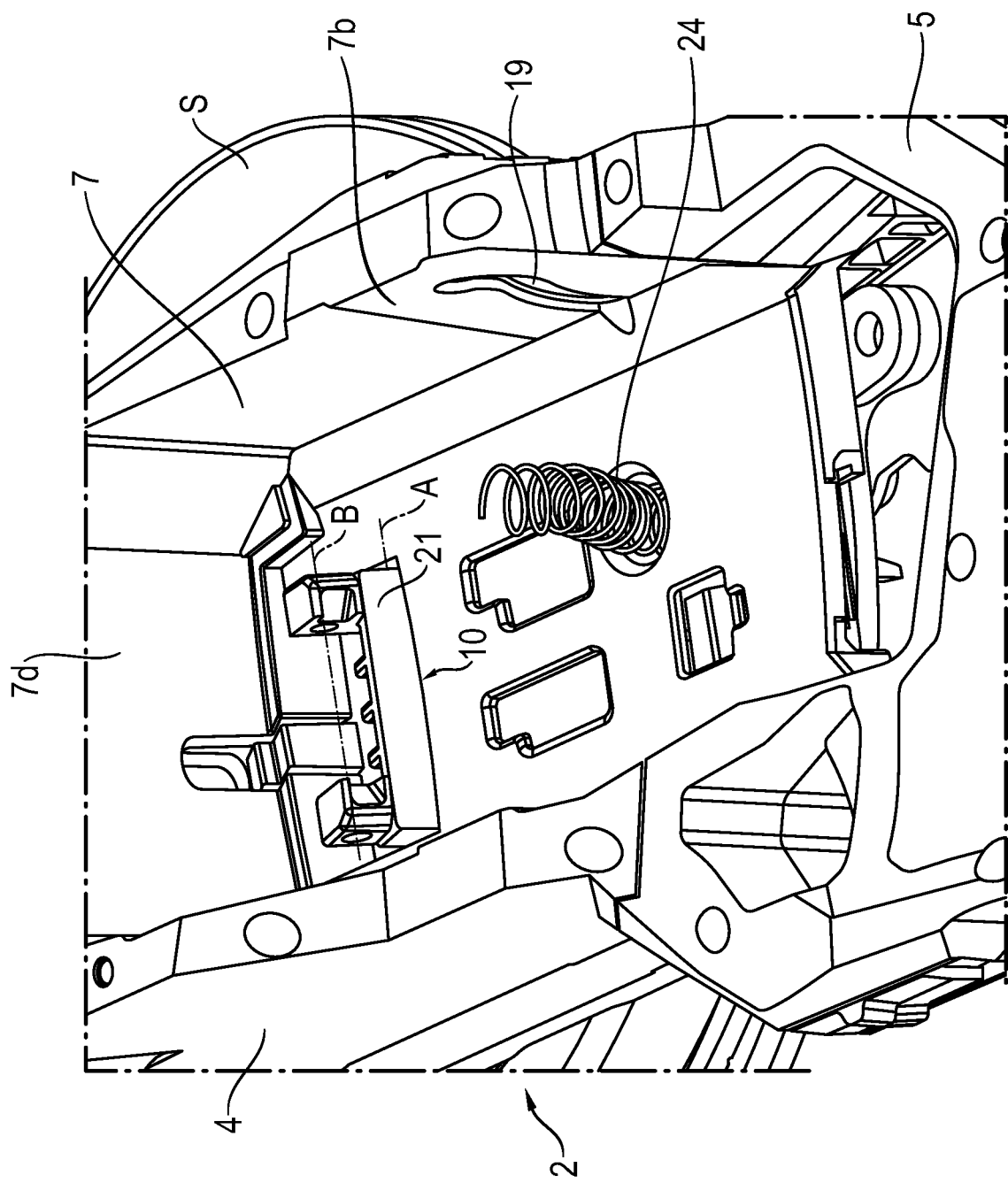
FIG. 25 shows another perspective partial view of the housing of the power tool, including a double hinge device in a second position.
Figure 26:
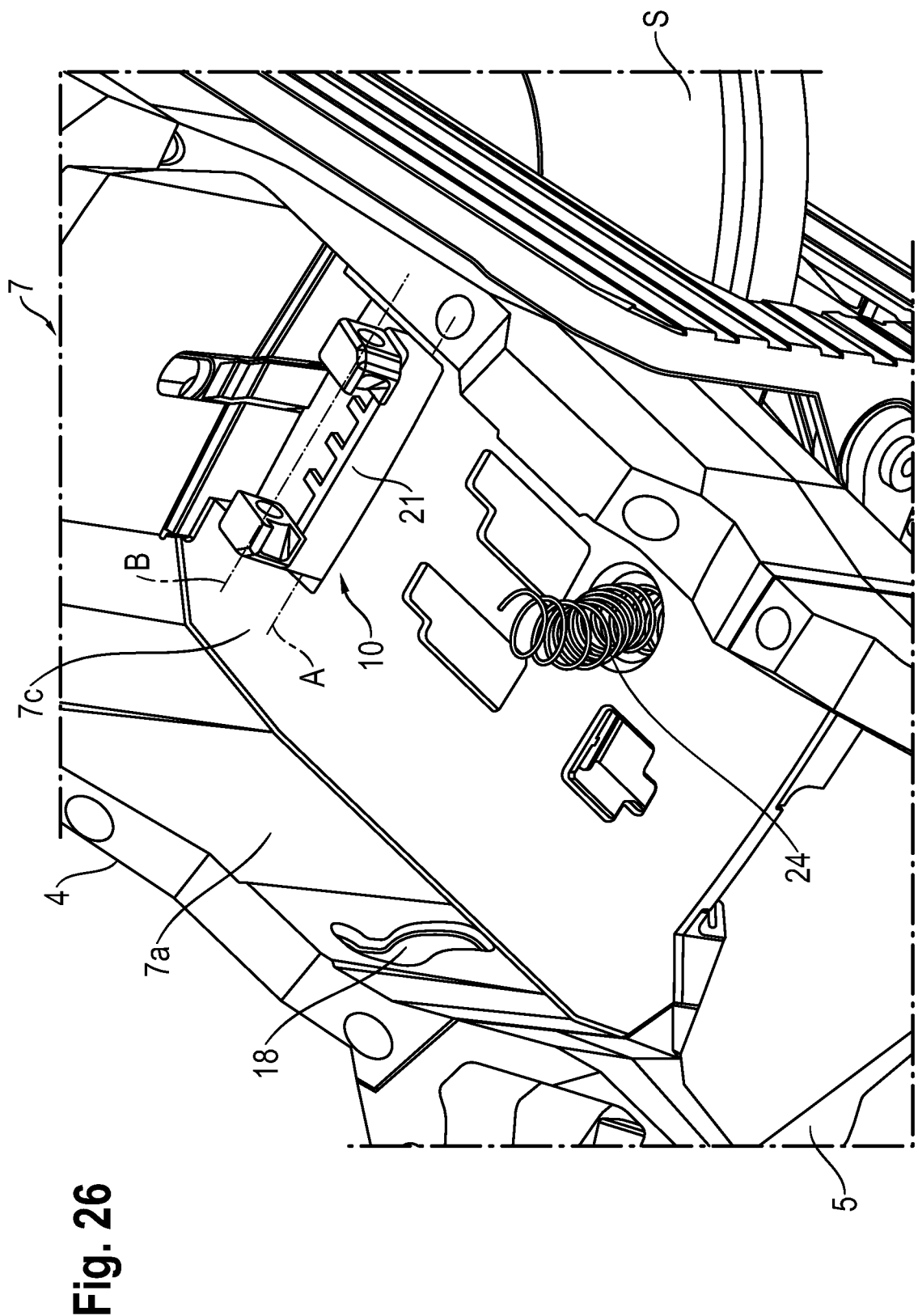
FIG. 26 shows another perspective partial view of the housing of the power tool, including a double hinge device in a second position.
Figure 27:
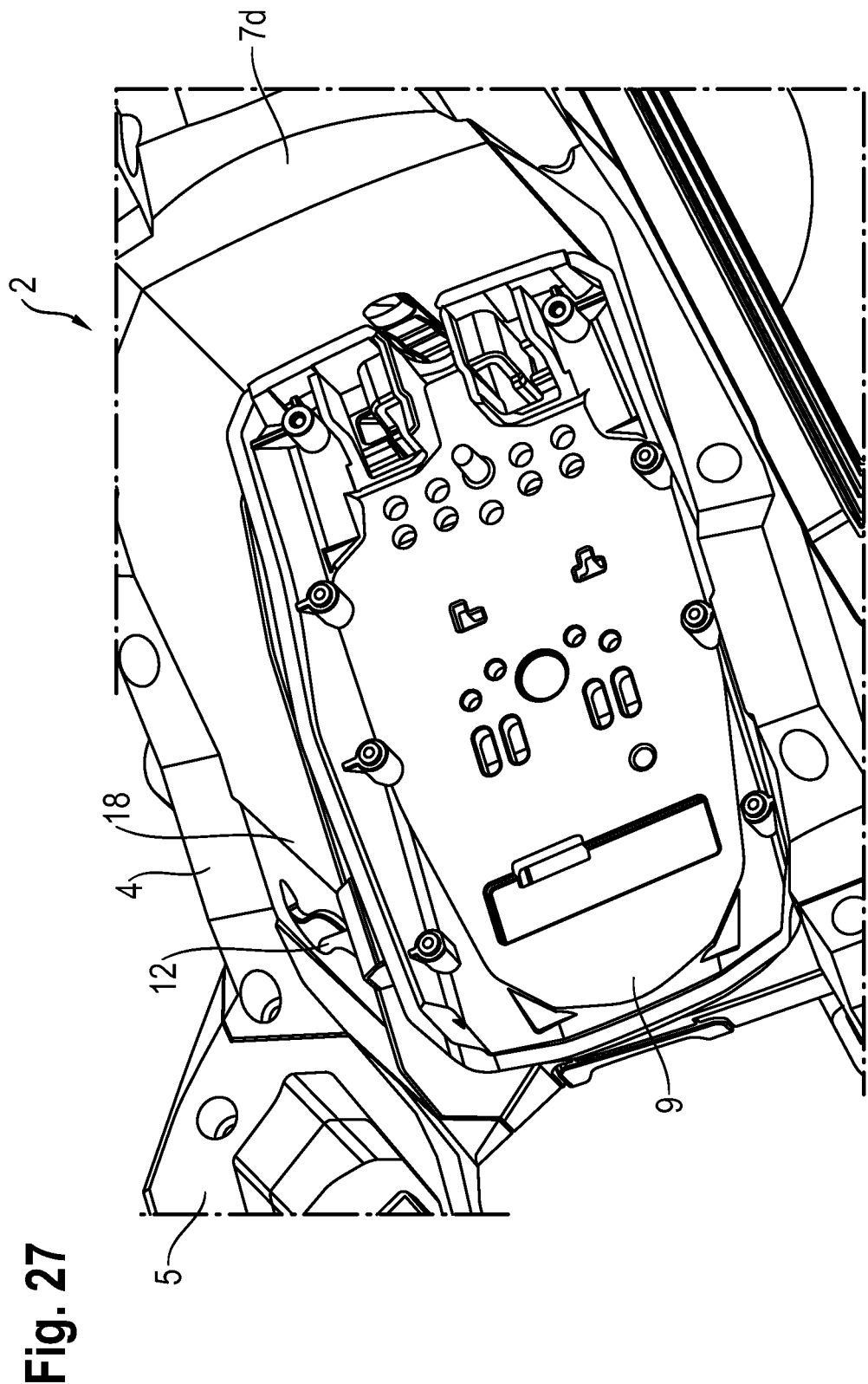
FIG. 27 shows a perspective view of the housing of the power tool, including the receiving plate in a first position.

In FIGS. 25 and 26, connecting element 21 of double hinge device 10 is shown in the second position. In the second position, connecting element 21 is essentially situated perpendicularly to base 7c of indentation 7 and extends out of recess 20 on base 7c of indentation 7.

Indentation 7 also contains a spring and a closing mechanism 25. As illustrated in FIGS. 22 through 26, spring 24 is designed in the form of a spiral spring and extends from base 7c of indentation 7. When receiving plate 9 is positioned in indentation 7, spring 24 is situated between base 7c of indentation 7 on underside 9b of receiving plate 9. The spring force of spring 24 presses receiving plate 9 away from base 7c of indentation 7 in arrow direction A.

Figure 4:
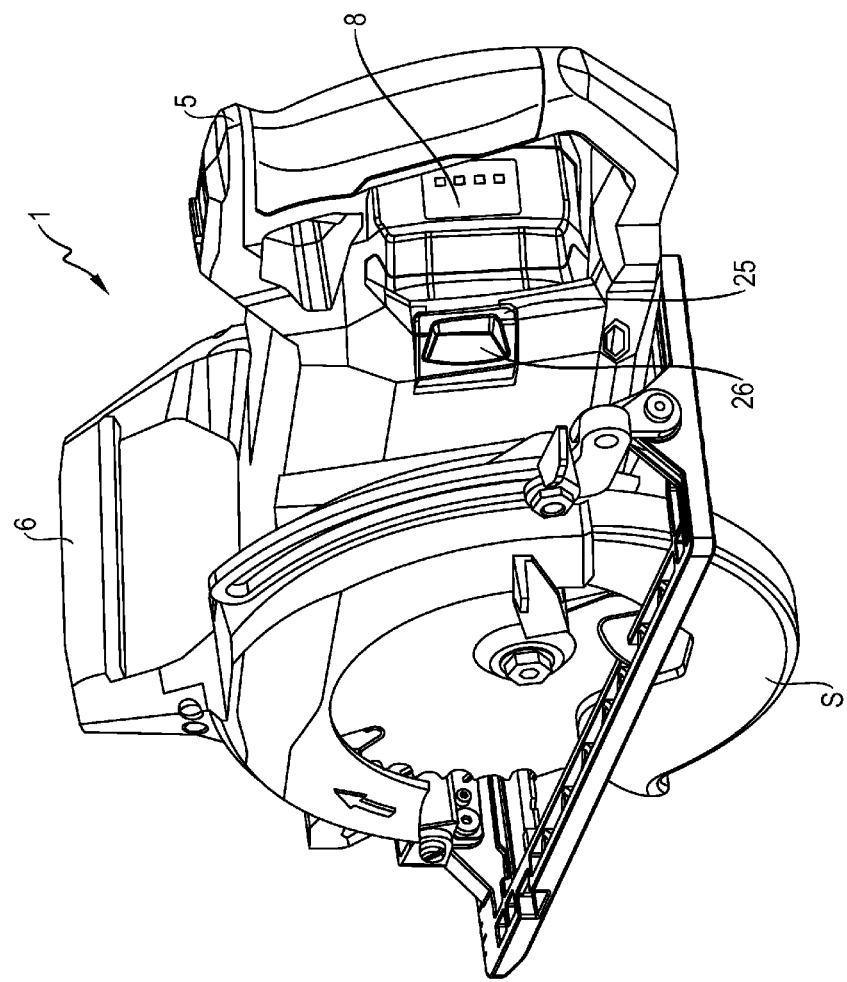
FIG. 4 shows another perspective view of the power tool, including the battery.

Closing mechanism 25 is also positioned on base 7c of indentation 7 and is used to hold receiving plate 9 on base 7c of indentation 7 and in the first position against the spring force of spring 24. A release element 26 for closing mechanism 25 is illustrated in FIGS. 4 and 22.

As already mentioned above, receiving plate 9 may be reversibly moved between a first and a second position relative to indentation 7. When receiving plate 9, together with contact device 11, is in the first position, and battery 8 has been pushed onto contact device 11, receiving plate 9 is situated in parallel on base 7c of indentation 7, and battery 8 is connected in a space-saving and ergonomic manner to power tool 1 designed as a circular saw.

Figure 34:
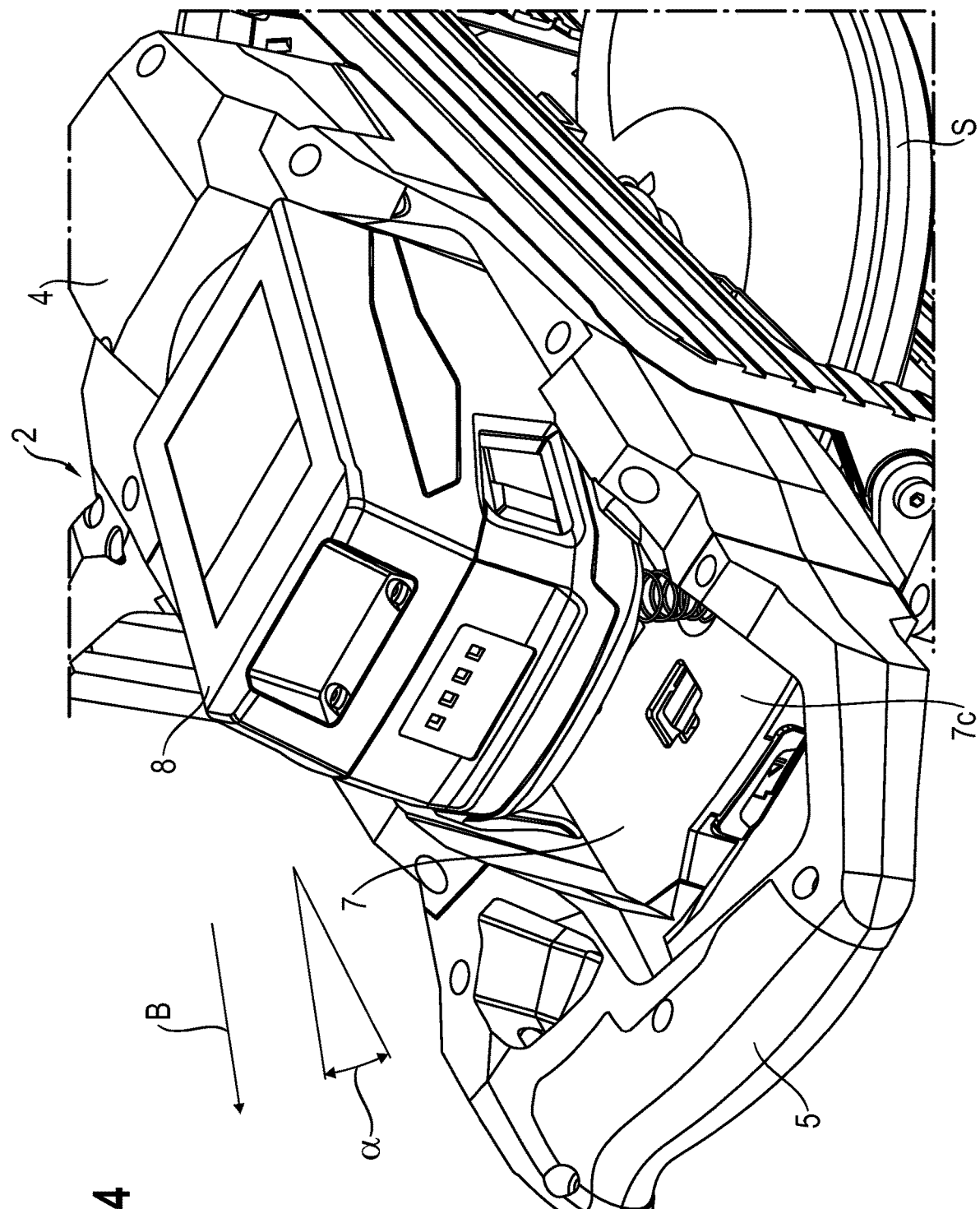
FIG. 34 shows a perspective view of the housing of the power tool, including the receiving plate and the battery in the second position.

When receiving plate 9, together with contact device 11, is in the second position and battery 8 is pushed onto contact device 11, receiving plate 9 is at an angle α with respect to base 7c of indentation 7 (cf. FIGS. 33 and 34). In the second position, battery 8 may be pulled past first rear handle 5 and out of contact device 11 or away from receiving plate 9 in arrow direction B. The second position is also used to push a battery 8 into contact device 11 or onto receiving plate 9 to connect it to power tool 1 as an energy source.

To be able to pivot receiving plate 9 between the first and the second position relative to indentation 7, third guide pin 14 of receiving plate 9 is positioned in first pivot bearing 22 of connecting element 21, and fourth guide pin 15 of receiving plate 9 is positioned in second pivot bearing 23 of connecting element 21 of double hinge device 10. First guide pin 12 is positioned in first guide groove 18, and second guide pin 13 is positioned in second guide groove 19 (cf. FIGS. 27 through 32).

When receiving plate 9 is pivoted from the first position to the second position, first guide pin 12 travels along first guide groove 18, and second guide pin 13 travels along second guide groove 19. Double hinge device 10 causes receiving plate 9 to be pivotable around first and second rotation axes A, B in a particularly space-saving manner.

What is claimed is:

1. A device for accommodating at least one battery on a power tool, the device comprising:
   a receiving plate for detachably holding the at least one battery, including at least one contact device for connecting the battery to the power tool; and
   a double hinge device having a first and a second rotation axis, the first rotation axis being positioned on a housing of the power tool, and the second rotation axis being positioned on the receiving plate, so that the receiving plate is reversibly pivotable between a first and a second position relative to the housing around the first as well as the second rotation axis;
   wherein the receiving plate contains a first and a second guide pin and the housing contains a first and a second guide groove, the first guide groove being designed to accommodate and guide the first guide pin, and the second guide groove being designed to accommodate and guide the second guide pin, so that the receiving plate is guided between the first and the second positions at least during the pivoting movement; and
   wherein the receiving plate has a third guide pin and a fourth guide pin, and the double hinge device includes a connecting element having a first pivot bearing and a second pivot bearing, the third guide pin being received in the first pivot bearing and the fourth guide pin in the second pivot bearing.

2. The device as recited in claim 1 wherein the receiving plate is received in an indentation in the housing in the first position.

3. The device as recited in claim 2 wherein a side of the receiving plate is parallel to a base of the indentation in the first position.

4. The device as recited in claim 2 wherein in the first position the connecting element lies flat against a base of the indentation and in the second position the connecting element is perpendicular to the base.

5. The device as recited in claim 1 wherein the second axis runs through the third and fourth guide pins and the first and second pivot bearings, and the first axis allows the connecting element to rotate about the housing.

6. A power tool comprising:
   a housing; and
   a device for accommodating at least one battery on the power tool, the device including:
      a receiving plate for detachably holding the at least one battery, including at least one contact device for connecting the battery to the power tool; and
      a double hinge device having a first and a second rotation axis, the first rotation axis being positioned on the housing, and the second rotation axis being positioned on the receiving plate, so that the receiving plate is reversibly pivotable between a first and a second position relative to the housing around the first as well as the second rotation axis;
   wherein the receiving plate contains a first and a second guide pin and the housing contains a first and a second guide groove, the first guide groove being designed to accommodate and guide the first guide pin, and the second guide groove being designed to accommodate and guide the second guide pin, so that the receiving plate is guided between the first and the second positions at least during the pivoting movement; and
   wherein the receiving plate has a third guide pin and a fourth guide pin, and the double hinge device includes a connecting element having a first pivot bearing and a second pivot bearing, the third guide pin being received in the first pivot bearing and the fourth guide pin in the second pivot bearing.

7. The power tool as recited in claim 6 wherein the power tool is a circular saw.

8. The power tool as recited in claim 6 further comprising the battery and wherein in the second position the battery is pullable out of the contact device.

9. The power tool as recited in claim 8 wherein the power tool has a handle and in the second position the battery is pullable out of the contact device past the handle.

10. The power tool as recited in claim 6 wherein the housing has an indentation accommodating the receiving plate and at least part of the battery in the first position.

11. The power tool as recited in claim 10 wherein the indentation has a base parallel to a side of the receiving plate in the first position.

12. The power tool as recited in claim 10 further comprising a spring in the indentation, the spring pressing the receiving plate away from a base of the indentation.

13. The power tool as recited in claim 12 further comprising a closing mechanism holding the receiving plate on the base against a force of the spring.

14. The power tool as recited in claim 6 wherein the second axis runs through the third and fourth guide pins and the first and second pivot bearings, and the first axis allows the connecting element to rotate about the housing.

15. The power tool as recited in claim 14 wherein in the first position the connecting element lies flat against a base of the indentation and in the second position the connecting element is perpendicular to the base.

* * * * *